(12) United States Patent
Okada et al.

(10) Patent No.: US 7,409,414 B2
(45) Date of Patent: Aug. 5, 2008

(54) COMPUTER SYSTEM, MANAGEMENT COMPUTER, STORAGE SYSTEM, AND BACKUP MANAGEMENT METHOD

(75) Inventors: Wataru Okada, Odawara (JP); Masahide Sato, Noda (JP); Hironori Emaru, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 382 days.

(21) Appl. No.: 11/328,285

(22) Filed: Jan. 10, 2006

(65) Prior Publication Data

US 2007/0112893 A1 May 17, 2007

(30) Foreign Application Priority Data

Nov. 15, 2005 (JP) ............................. 2005-330754

(51) Int. Cl.
G06F 12/00 (2006.01)
G06F 12/16 (2006.01)
G06F 12/12 (2006.01)
(52) U.S. Cl. ............................. 707/204; 711/162; 714/6
(58) Field of Classification Search ................ 707/204; 711/162; 714/6
See application file for complete search history.

(56) References Cited

U.S. PATENT DOCUMENTS

| | | | | |
|---|---|---|---|---|
| 6,839,819 | B2* | 1/2005 | Martin | 711/162 |
| 7,085,904 | B2* | 8/2006 | Mizuno et al. | 711/162 |
| 7,162,601 | B2* | 1/2007 | Yamagami | 711/162 |
| 7,167,880 | B2* | 1/2007 | Amano et al. | 707/205 |
| 7,243,197 | B2* | 7/2007 | Yamagami | 711/161 |
| 2005/0015416 | A1* | 1/2005 | Yamagami | 707/204 |
| 2005/0235016 | A1* | 10/2005 | Amano et al. | 707/204 |
| 2006/0149798 | A1* | 7/2006 | Yamagami | 707/204 |

(Continued)

FOREIGN PATENT DOCUMENTS

EP 1 804 167 A2 * 12/2005

(Continued)

OTHER PUBLICATIONS

Michael Adams, How Snapshot Technology Will Change The Future Of Backup And Recovery—Technology Information, Computer Technology Review, Jan. 2001.*

(Continued)

*Primary Examiner*—Chameli Das
*Assistant Examiner*—Gary J Koo
(74) *Attorney, Agent, or Firm*—Antonelli, Terry, Stout & Kraus, LLP.

(57) ABSTRACT

A computer system includes a host computer; a storage system for obtaining a snapshot, at a specific point in time, of a data volume, storing data written to the data volume after the specific point in time as a journal, and applying the journal to the snapshot for data recovery; and a management computer. In the computer system, the management computer instructs the storage system to determine whether data at a recovery point after a recovery point of the latest snapshot can be recovered within a specific period of time and to apply, if it has been determined that the data cannot be recovered within the specific period of time, a journal to the latest snapshot to update the latest snapshot to a new snapshot in such a manner that the data can be recovered within the specific period of time.

20 Claims, 19 Drawing Sheets

U.S. PATENT DOCUMENTS

| | | | |
|---|---|---|---|
| 2007/0083567 A1* | 4/2007 | Arai et al. | 707/200 |
| 2007/0100917 A1* | 5/2007 | Amano et al. | 707/205 |
| 2007/0112893 A1* | 5/2007 | Okada et al. | 707/204 |
| 2007/0112894 A1* | 5/2007 | Okada et al. | 707/204 |
| 2007/0115738 A1* | 5/2007 | Emaru et al. | 365/203 |
| 2007/0185923 A1* | 8/2007 | Nishikawa et al. | 707/202 |
| 2007/0198604 A1* | 8/2007 | Okada et al. | 707/202 |
| 2007/0220309 A1* | 9/2007 | Andre et al. | 714/6 |

FOREIGN PATENT DOCUMENTS

JP    2005-001541    1/2005

OTHER PUBLICATIONS

M. Kaczmarski, Beyond Backup Toward Storage Management, IBM Systems Journal, vol. 42, No. 2, Apr. 2003.*

* cited by examiner

FIG.3

JOURNAL GROUP TABLE

| JNL GROUP ID | SEQUENCE COUNTER | LATEST JNL HEADER STORAGE VOLID | LATEST JNL HEADER STORAGE ADDRESS | OLDEST JNL HEADER STORAGE VOLID | OLDEST JNL HEADER STORAGE ADDRESS |
|---|---|---|---|---|---|
| JNLG_01 | 110 | J-VOL_01 | 10000 | J-VOL_01 | 11000 |
| JNLG_02 | 103 | J-VOL_11 | 20000 | J-VOL_11 | 21000 |
| ... | ... | ... | ... | ... | ... |

DATA VOLUME TABLE

| JNL GROUP ID (4001) | DATA VOLUME ID (4002) | SEQUENCE (4003) | SIZE (4004) |
|---|---|---|---|
| JNLG_01 | VOL_01 | 1 | 10G |
| JNLG_01 | VOL_02 | 3 | 20G |
| JNLG_01 | VOL_03 | 2 | 10G |
| JNLG_02 | VOL_11 | 1 | 10G |
| ... | ... | ... | ... |

SNAPSHOT TABLE

| JNL GROUP ID (5001) | SSVOL GROUP ID (5002) | SEQUENCE NUMBER (5003) | ACQUISITION TIME (5004) | JOURNAL APPLICATION SPEED(M/SEC) (5005) |
|---|---|---|---|---|
| JNLG_01 | SS_01 | 100 | 2005/06/01 10:00 | 40 |
| JNLG_01 | SS_02 | 105 | 2005/06/01 11:00 | 40 |
| JNLG_01 | SS_03 | 110 | 2005/06/01 12:00 | 30 |
| JNLG_02 | SS_11 | 100 | 2005/06/01 10:00 | 30 |
| ... | ... | ... | ... | ... |

SNAPSHOT VOLUME TABLE

| SSVOL GROUP ID | SNAPSHOT VOLUME ID | SEQUENCE | SIZE |
|---|---|---|---|
| SS_01 | SVOL_01 | 1 | 10G |
| SS_01 | SVOL_02 | 3 | 20G |
| SS_01 | SVOL_03 | 2 | 10G |
| SS_02 | SVOL_11 | 1 | 10G |
| ... | ... | ... | ... |

FIG.7

JOURNAL VOLUME TABLE

| JNL GROUP ID | JNL VOLUME ID | CAPACITY | SEQUENCE |
|---|---|---|---|
| JNLG_01 | J-VOL_01 | 10G | 1 |
| JNLG_01 | J-VOL_02 | 10G | 3 |
| JNLG_01 | J-VOL_03 | 10G | 2 |
| JNLG_02 | J-VOL_11 | 10G | 1 |
| ... | ... | ... | ... |

JOURNAL GROUP CONFIGURATION DEFINITION FILE

FIG.9

APPLICATION TABLE

| APPLICATION ID | HOST ADDRESS | STORAGE ID | JNL GROUP ID | MONITORING INTERVAL (SEC) | REQUESTED RTO (SEC) | REQUESTED RTO APPLICATION PERIOD (HRS) | RTO ADJUSTMENT START THRESHOLD (SEC) | RTO ADJUSTMENT END VALUE (SEC) |
|---|---|---|---|---|---|---|---|---|
| DB1 | 192.168.0.1 | ST1 | JNLG_01 | 60 | 300 | 24 | 270 | 150 |
| DB2 | 192.168.0.1 | ST1 | JNLG_02 | 60 | 600 | 72 | 540 | 300 |
| ... | ... | ... | ... | ... | ... | ... | ... | ... |

FIG.10

STORAGE TABLE

| STORAGE ID | IP ADDRESS |
|---|---|
| ST1 | 192.168.1.1 |
| ST2 | 192.168.1.2 |
| ... | ... |

FIG.16

SPARE VOLUME MANAGEMENT TABLE

| SPARE VOLUME ID | SIZE |
|---|---|
| SPARE_VOL_1 | 10G |
| SPARE_VOL_2 | 10G |
| SPARE_VOL_3 | 20G |
| SPARE_VOL_4 | 10G |
| ... | ... |

COMPUTER SYSTEM, MANAGEMENT COMPUTER, STORAGE SYSTEM, AND BACKUP MANAGEMENT METHOD

The present application is based on and claims priority of Japanese patent application No. 2005-330754 filed on Nov. 15, 2005, the entire contents of which are hereby incorporated by reference.

BACKGROUND

The present invention relates to computer systems, and particularly to a specific configuration of a computer system and to a backup management method based on this configuration.

Information systems are generally configured to backup data so that data can be recovered if it is lost due to storage device failures, data corruption caused by virus attacks, user errors, or the like.

Data backup and recovery techniques using journaling have been proposed to solve the problem of data loss (see, e.g., U.S. Patent Application Publication No. 2005/0015416). This document discloses a technique in which a snapshot (i.e., a full backup image or a logical image including a differential backup image), at a specific point in time, of a logical group (hereinafter called "journal group") containing at least one data volume is obtained; data subsequently written to the data volume belonging to the journal group is maintained as a journal (called "After journal" or "post journal"); a series of After journals is applied to the obtained snapshot in the order in which data was written; and thus data at the specific point in time can be recovered. The technique disclosed in this document is an example of a technique generally called "continuous data protection (CDP)".

The time required for data recovery by the above-described journal application (hereinafter called "recovery time") depends on the amount of data of journals applied. Therefore, the above-described U.S. Patent Application Publication No. 2005/0015416 further discloses a technique in which, for the recovery of data at a specific point in time, multiple generations of snapshots are taken; A series of journals are applied to a snapshot taken in close proximity to this specific point in time. and thus the recovery time can be reduced. The worst value of the time required for data recovery is called "recovery time objective (RTO)".

Another technique proposed is one in which, if data recovered by the application of After journals has already been corrupted, this application of After journals is cancelled (see, e.g., U.S. Patent Application Publication No. 2005/0015416). In the technique disclosed in this document, a portion of data to be overwritten by the application of After journals is saved. Then, if the application of After journals needs to be cancelled, the saved data is written onto a snapshot to which the After journals were applied (i.e., the saved data is restored to its original location). Thus, the snapshot before the application of the After journals can be restored in a short period of time. The saved data described above is called "Before journal". The term "journal" is used to refer collectively to both Before and After journals.

Hereinafter, a point designated by an administrator for the purpose of recovering data at a specific point in time will be referred to as "recovery point". When data at a designated recovery point is to be recovered by the application of a series of journals to a snapshot, the relationship between the last applied journal and the designated recovery point will be expressed as "the journal has the recovery point." If data can be recovered without applying a journal to a snapshot, the relationship between this snapshot and a designated recovery point will be expressed as "the snapshot has the recovery point." Moreover, when a specific journal is applied to a snapshot, a journal created, for canceling the application of the specific journal, by saving a portion of data to be overwritten is called "corresponding journal" or "saved journal".

In case of data corruption, an increase in recovery time generally causes increases in operational downtime and damage. Therefore, it is important to reduce recovery time and recover data at any point in time within the time period requested by an administrator (hereinafter expressed as "to satisfy a requested RTO"). In general, a snapshot is periodically taken (e.g., every hour) and multiple generations of snapshots are maintained to reduce recovery time. However, recovery time depends on the amount of journal data to be applied to the snapshot, and the amount of journal data to be applied depends on the amount and frequency of writing in practice. A problem here is that if a snapshot is taken periodically, there will be a recovery point that cannot satisfy a requested RTO.

SUMMARY

The present invention has been made to solve the problems described above. According to the present invention, when the Recovery times for some recovery points after the latest snapshot exceed a certain amount, an After journal is applied to the latest snapshot to update the image of the latest snapshot. An object of the present invention is to provide a snapshot management method in which, if the above-described updating has prevented Recovery times for some recovery points before the latest snapshot from satisfying a requested RTO, the After journal is also applied to a snapshot before the latest snapshot to update its image and thus to recover data at any recovery point within the requested RTO. Hereinafter, updating the image of a snapshot is expressed as "updating a snapshot".

A computer system of the present invention includes at least one host computer; a storage system for obtaining a snapshot, at a specific point in time, of a data volume to and from which data used by the host computer is written and read, storing data written to the data volume after the specific point in time as a journal, and applying the journal to the snapshot, for data recovery, on the basis of a snapshot obtained in close proximity to a recovery point, thereby recovering data; and a management computer. The host computer, storage system, and management computer in the computer system are connected to each other via a network. The management computer in the computer system instructs the storage system to determine whether data at a recovery point after a recovery point of the latest snapshot can be recovered within a specific period of time and to apply, if it has been determined that the data cannot be recovered within the specific period of time, a journal to the latest snapshot to update the latest snapshot to a new snapshot in such a manner that the data can be recovered within the specific period of time.

According to the present invention, data at any point in time can be recovered within an RTO requested by the administrator, since the time required for journal application to a snapshot is consistently below a certain level.

BRIEF DESCRIPTION OF THE DRAWINGS

FIG. 3 shows an exemplary journal group table of the first embodiment.

FIG. 4 shows an exemplary data volume table of the first embodiment.

FIG. 5 shows an exemplary snapshot table of the first embodiment.

FIG. 6 shows an exemplary snapshot volume table of the first embodiment.

FIG. 7 shows an exemplary journal volume table of the first embodiment.

FIG. 9 shows an exemplary application table of the first embodiment.

FIG. 10 shows an exemplary storage table of the first embodiment.

FIG. 16 shows an exemplary spare volume management table of the third embodiment.

DESCRIPTION OF THE PREFERRED EMBODIMENTS

The best modes for carrying out the present invention will now be described.

The scope of the present invention is not limited to embodiments and examples of a computer system, management computer, storage system, and backup management method that will be described below with reference to the drawings.

In the embodiments of the present invention, a management computer for managing a storage system with a controller for controlling backup and restoring operations based on a journaling technique includes a configuration program, a snapshot management program, and snapshot management information. The configuration program registers, in the snapshot management information, an RTO requested by an administrator, an RTO threshold that triggers the start of RTO adjustment, and an RTO target to which an RTO is to be reduced by the RTO adjustment. The snapshot management program periodically obtains journal storage information and snapshot storage information and determines, with respect to every recovery point after the recovery point of the latest snapshot, whether data is recoverable within the RTO threshold, on the basis of the data length of a journal having the recovery point and on the application speed of the journal. If it has been determined that the data cannot be recovered within the RTO threshold, a journal is applied to the latest snapshot such that data at every recovery point can be recovered within the RTO target. If the updating of the latest snapshot prevents data at a recovery point before the recovery point of the latest snapshot from being recovered within the requested RTO, an older snapshot than the latest snapshot is updated such that data at every recovery point after the older snapshot can be recovered within the requested RTO.

Figure 19:
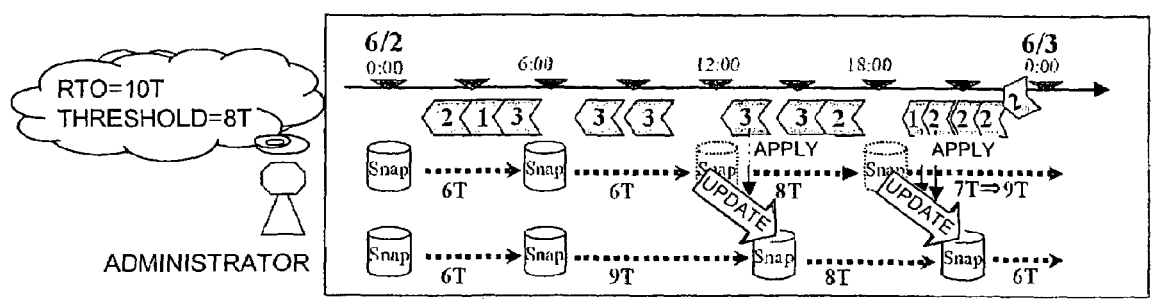
FIG. 19 illustrates a backup management method of the embodiments of the present invention.

For example, as illustrated in FIG. 19, journal and snapshot storage information is checked periodically (e.g., every minute), and the latest snapshot is updated when the total amount of data written after the latest snapshot exceeds a threshold. Specifically, as shown, since the total amount of data written during the period from 18:00 to 0:00 reaches 9T, which exceeds the threshold (8T), three hours of journal (3T) is applied to a snapshot taken at 18:00. Thus, the snapshot taken at 18:00 is updated to a newer snapshot taken at 21:00. Then, the total amount of data written during the period from 21:00 to 0:00 is reduced to 6T (given by 9T−3T), which is below the threshold (8T). In this case, since the total amount of data written during the period from 12:00 to 21:00 reaches 11T (given by 8T+3T), which exceeds both the threshold (8T) and RTO (10T), three hours of journal (3T) is applied to a snapshot taken at 12:00. Thus, the snapshot taken at 12:00 is updated to a newer snapshot taken at 15:00. Then, the total amount of data written during the period from 15:00 to 21:00 becomes 8T, which is within the threshold (8T). Although the total amount of data written during the period from 6:00 to 15:00 reaches 9T (given by 6T+3T), which exceeds the threshold (8T), a snapshot taken at 6:00 is not updated, as the RTO (10T) is not exceeded.

First Embodiment (1) System Configuration of First Embodiment

Figure 1:
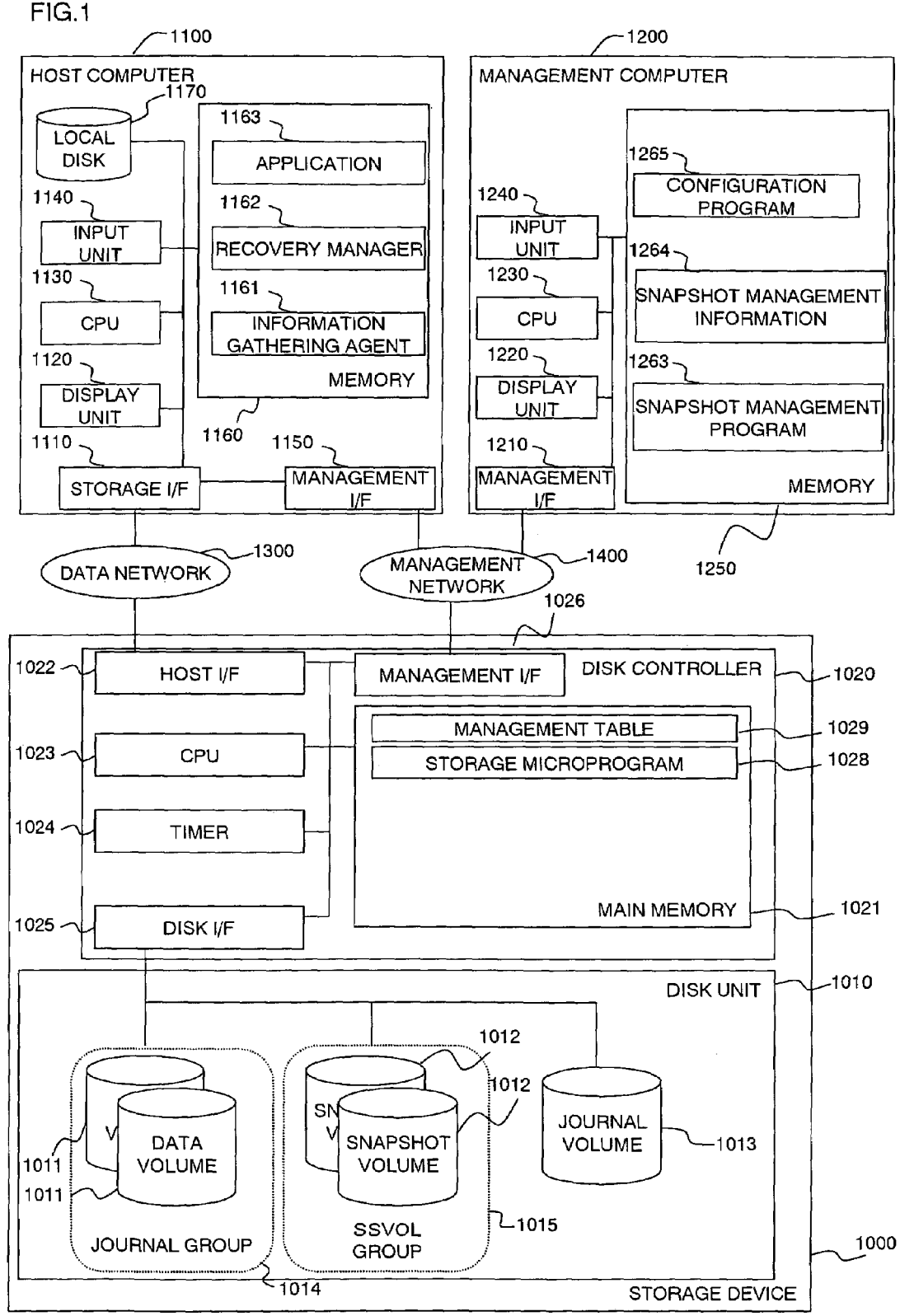
FIG. 1 shows a system configuration according to a first embodiment of the present invention.

FIG. 1 is a block diagram showing the configuration of a computer system of the first embodiment. In this computer system, a storage device 1000 and a host computer 1100 are connected to each other via a data network 1300. While the data network 1300 in the present embodiment is a storage area network, this may be replaced with an Internet protocol (IP) network or another type of data communication network.

The storage device 1000 and the host computer 1100 are connected to a management computer 1200 via a management network 1400. While the management network 1400 in the present embodiment is an IP network, this may be replaced with a storage area network or another type of data communication network. The data network 1300 and the management network 1400 may be configured as a single network, and the management computer 1200 and the host computer 1100 may be configured as a single computer.

For convenience of explanation, FIG. 1 shows one storage device 1000, one host computer 1100, and one management computer 1200. However, the present invention does not limit the number of each of these components to one. While one or more storage devices are generally referred to as a storage system, they may be referred to as a "storage device" in the following description, without making any distinction. It is also possible that a storage system includes a management computer.

The storage device 1000 includes a disk unit 1010 for storing data and a disk controller 1020 serving as an internal controller for the storage device 1000.

The disk unit 1010 includes a journal group 1014, an SSVOL group 1015, and a journal volume 1013.

The journal group 1014 contains at least one data volume 1011 that is a logical volume for storing data to be used by the host computer 1100. Under the control of a storage microprogram 1028 described below, data written by the host computer 1100 to the data volume 1011 belonging to the journal group 1014 is stored, in the journal volume 1013 associated with the journal group 1014, as After journals with appropriate sequence numbers assigned according to the order in which data was written.

A duplicate image (snapshot) of the journal group 1014 at a given point in time is stored in the SSVOL group 1015. While FIG. 1 shows only one (i.e., one generation of) SSVOL group 1015 with respect to the single journal group 1014, multiple (i.e., multiple generations of) SSVOL groups with respect to the single journal group 1014 can be provided as requested by the administrator. The SSVOL group 1015 contains at least one snapshot volume 1012 for storing a duplicate image of the data volume 1011 at a given point in time. A duplicate image to be stored in the snapshot volume 1012 may be a full backup image or a logical image, such as a differential backup image, of the data volume 1011, depending on requests to the system and implementation on the system.

The journal volume 1013 is a volume in which After journals and Before journals are stored. The configuration of the journal volume 1013 will be described below.

For convenience of explanation, FIG. 1 shows one journal group 1014 and one journal volume 1013. However, the present invention does not limit the number of each of these to one.

The disk controller 1020 includes a host interface (I/F) 102-2, a management I/F 1026, a disk I/F 1025, a main memory 1021, a central processing unit (CPU) 1023, and a timer 1024.

A management table 1029 and the storage microprogram 1028 are stored in the main memory 1021. The CPU 1023 executes a program stored in the main memory 1021.

The storage microprogram 1028 controls various functions of backup and restoring operations using a known journaling technique. The various functions include the acquisition of snapshots, creation of After and Before journals, data recovery using journals, and freeing of journals. The storage microprogram 1028 controls these functions while referring to or updating information contained in the management table 1029. Moreover, in response to requests from the management computer 1200 and host computer 1100, the storage microprogram 1028 controls data input/output to/from the disk unit 1010, provides performance information in the storage device 1000, and sets and provides control information in the storage device 1000.

The timer 1024 is a typical timer capable of providing the current time. The storage microprogram 1028 refers to the timer 1024 at the time of the creation of an After journal and acquisition of a snapshot.

The host I/F 1022 is an interface to the data network 1300, and sends and receives data and control instructions to and from the host computer 1100. The management I/F 1026 is an interface to the management network 1400, and sends and receives data and control instructions to and from the host computer 1100 and management computer 1200. The disk I/F 1025 is an interface to the disk unit 1010, and sends and receives data and control instructions to and from the disk unit 1010.

The configuration of the management table 1029 will be described below.

The host computer 1100 includes an input unit 1140 including a keyboard, a mouse, and the like, a CPU 1130, a display unit 1120, such as a cathode-ray tube (CRT), a memory 1160, a storage I/F 1110, a management I/F 1150, and a local disk 1170.

The storage I/F 1110 is an interface to the data network 1300, and sends and receives data and control instructions to and from the storage device 1000. The management I/F 1150 is an interface to the data network 1300. For the purpose of system management, the management I/F 1150 sends and receives data and control instructions to and from the management computer 1200 and storage device 1000.

An application 1163, a recovery manager 1162, and an information gathering agent 1161 are installed in the memory 1160 and are executed by the CPU 1130.

The application 1163 is an application capable of reading and writing data from and to the data volumes 1011. Examples of the application 1163 include a database management system (DBMS) and a file system.

The recovery manager 1162 requests the storage microprogram 1028 to take a snapshot, requests the storage microprogram 1028 to recover data at a specific point in time, and stabilizes the application 1163. These functions are provided through a command line interface (hereinafter called "CLI") so as to be performed by the administrator or other programs. The recovery manager 1162 also has functions of configuring settings related to a backup operation using journaling, via the data network 1300, in the management table 1029, and providing a CLI for the administrator to use this function.

The local disk 1170 is a disk device, such as a hard disk, and is directly connected to the host computer 1100. A system configuration definition file group (not shown) is stored on the local disk 1170. The system configuration definition file group is a group of files in which system configuration definitions, such as which data volume 1011 is to be used by the application 1163 and which the data volume 1011 belongs to which journal group 1014, are described by the administrator at the time of system development. Examples of such a system configuration definition file group include an /etc/fstab file used by a typical Linux® operating system.

The information gathering agent 1161 is a program that collects system configuration information about the host computer 1100. In response to a request from a configuration program 1265 described below and based on the system configuration definition file group stored in the local disk 1170, the information gathering agent 1161 identifies the journal group 1014 used by the application 1163 and the storage device 1000 to which the journal group 1014 belongs. Then, the information gathering agent 1161 returns the identifier of the identified journal group 1014 and the identifier of the identified storage device 1000 to the configuration program 1265.

For convenience of explanation, FIG. 1 shows one application 1163. However, the present invention does not limit the number of applications to one.

The management computer 1200 includes an input unit 1240 including a keyboard, a mouse, and the like, a CPU 1230, a display unit 1220 such as a CRT, a memory 1250, and a management I/F 1210 for sending and receiving data and control instructions to and from the management computer 1200 and storage device 1000 for the purpose of system management.

The configuration program 1265, snapshot management information 1264, and a snapshot management program 1263 are stored in the memory 1250 of the management computer 1200. The CPU 1230 executes each of the programs stored in the memory 1250 to perform their corresponding functions.

The configuration program 1265 provides a graphical user interface (GUI) for setting management information about the present system. The configuration program 1265 sets the snapshot management information 1264 based on values entered through the GUI.

The snapshot management program 1263 periodically refers to the storage microprogram 1028 for journal storage information and snapshot storage information to determine whether an RTO requested by the administrator can be satisfied. If it is determined that the requested RTO cannot be satisfied, the snapshot management program 1263 requests the storage microprogram 1028 to update a snapshot in a manner such that the requested RTO can be satisfied.

The configuration of the snapshot management information 1264 will be described below.

Figure 2:
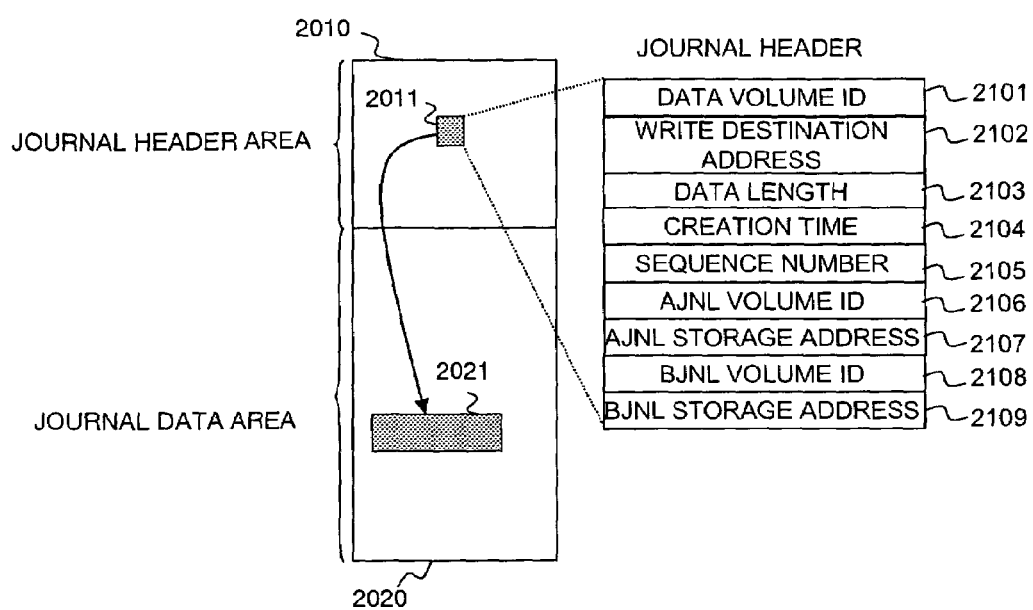
FIG. 2 shows an exemplary configuration of a journal volume according to the first embodiment.

FIG. 2 shows an exemplary configuration of the journal volume 1013 of the present embodiment. The journal volume 1013 is logically divided into a journal header area 2010 and a journal data area 2020.

A journal is divided into a journal header 2011 and journal data 2021 when stored in the journal volume 1013. The journal header 2011 is stored in the journal header area 2010, while the journal data 2021 is stored in the journal data area 2020.

The journal data 2021 is written to the data volume 1011 at the time of journal application. The journal header 2011 contains information about the journal data 2021.

The journal header 2011 contains a Data Volume ID 2101, a Write Destination Address 2102, a Data Length 2103, a Creation Time 2104, a Sequence Number 2105, an AJNL Volume ID 2106, an AJNL Storage Address 2107, a BJNL Volume ID 2108, and a BJNL Storage Address 2109.

The Data Volume ID 2101 holds the identifier of a data volume 1011 to which journal data is to be written when a journal is applied. The Write Destination Address 2102 holds an address at which journal data is to be written when a journal is applied. The Data Length 2103 holds the length of data to be written, that is, the length of the journal data 2021. At the time of creation of an After journal, the storage microprogram 1028 interprets a write request from the host computer 1100 to obtain and set the above-described values.

The Creation Time 2104 holds the time at which a write request from the host computer 1100 arrived at the storage device 1000. The value of the Creation Time 2104 is obtained, from the timer 1024 in the disk controller 1020, and set by the storage microprogram 1028. The Creation Time 2104 is used as a recovery point that the administrator designates to perform data recovery. In a modified embodiment, the value of the Creation Time 2104 may be a write command issue time included in a write request. For example, in a mainframe-based environment, since a plurality of mainframe hosts share a timer and can provide a time at which a write command was issued, it is possible to use this issue time.

The Sequence Number 2105 holds a sequence number for determining, for data recovery, which journal is to be applied to which snapshot. The value of the Sequence Number 2105 is obtained, from values contained in a Sequence Counter 3003 of a journal group table 3000 (described below) at the time of creation of an After journal in response to the writing of data from the host computer 1100, and set by the storage microprogram 1028.

The AJNL Volume ID 2106 holds the identifier of a volume in which the journal data of an After journal is stored. The AJNL Storage Address 2107 holds the address at which the After journal is stored. The storage microprogram 1028 sets these values at the time of creation of the After journal. When the journal data of the After journal is freed, the storage microprogram 1028 assigns a NULL to the AJNL Volume ID 2106 and to the AJNL Storage Address 2107.

The BJNL Volume ID 2108 holds the identifier of a volume in which the journal data of a Before journal is stored. The BJNL Storage Address 2109 holds the address at which the Before journal is stored. The storage microprogram 1028 sets these values at the time of creation of the Before journal. When the journal data of the Before journal is freed, the storage microprogram 1028 assigns a NULL to the BJNL Volume ID 2108 and to the BJNL Storage Address 2109.

If the AJNL Volume ID 2106, the AJNL Storage Address 2107, the BJNL Volume ID 2108, and the BJNL Storage Address 2109 are all NULL, the storage microprogram 1028 frees the journal header 2011.

The journal header 2011 is created when the storage microprogram 1028 creates an After journal in response to the writing of data from the host computer 1100. That is, when creating a Before journal, the storage microprogram 1028 assigns the identifier of a volume in which the journal data 2021 of the Before journal is stored to the BJNL Volume ID 2108, and assigns an address at which the journal data 2021 of the Before journal is stored to the BJNL Storage Address 2109. Similarly, to create the After journal again after being freed, the storage microprogram 1028 assigns the identifier of a volume in which the journal data 2021 of the After journal is stored to the AJNL Volume ID 2106, and assigns an address at which the journal data 2021 of the After journal is stored to the AJNL Storage Address 2107.

FIG. 3 to FIG. 9 show an exemplary group of tables constituting the management table 1029 in FIG. 1. FIG. 3 shows the journal group table 3000 constituting a part of the management table 1029. The journal group table 3000 contains a JNL Group ID 3001 holding the identifiers of journal groups, the Sequence Counter 3003, a Latest JNL Header Storage VOLID 3004 holding the identifiers of volumes in which the latest journal headers are stored, a Latest JNL Header Storage Address 3005 holding addresses at which the latest journal headers are stored, an Oldest JNL Header Storage VOLID 3006 holding the identifiers of volumes in which the oldest journal headers are stored, and an Oldest JNL Header Storage Address 3007 holding addresses at which the oldest journal headers are stored.

The administrator sets values of the JNL Group ID 3001 using the CLI provided by the recovery manager 1162. For example, the administrator issues a command "CreateJG-id JNLG_01" requesting the creation of a journal group with the identifier "JNLG_01". The value JNLG_01 is stored in the JNL Group ID 3001.

The Sequence Counter 3003 holds numbers for managing the order in which journals and snapshots were created. The storage microprogram 1028 increments a value of the Sequence Counter 3003 by one every time an After journal is created in response to the writing of data from the host computer 1100, and copies the incremented value to the Sequence Number 2105. Moreover, the storage microprogram 1028 copies a value of the Sequence Counter 3003 to a Sequence Number 5003 of a snapshot table 5000 (described below) every time a snapshot is taken. The sequential relationships of snapshots and journals have thus been recorded, and a journal to be applied to a snapshot can be identified when data recovery is performed. Specifically, for performing data recovery by the application of After journals to a specific snapshot, a series of journals with sequence numbers greater than that of the snapshot and less than or equal to that of a journal having a designated recovery point are applied to the snapshot according to the sequence numbers. For performing data recovery by the application of Before journals to a specific snapshot, a series of journals with sequence numbers less than or equal to that of the snapshot and greater than that of a journal having a designated recovery point are applied to the snapshot in descending order of sequence number.

The Latest JNL Header Storage VOLID 3004, the Latest JNL Header Storage Address 3005, the Oldest JNL Header Storage VOLID 3006, and the Oldest JNL Header Storage Address 3007 are used to determine the volume in which and the address at which a new journal header is to be stored, and to identify the journal to be deleted, and are updated by the storage microprogram 1028 when a new journal header is created and when a journal is deleted.

FIG. 4 shows a data volume table 4000 constituting a part of the management table 1029. The data volume table 4000 indicates data volumes belonging to each journal group. The data volume table 4000 contains a JNL Group ID 4001, a Data Volume ID 4002, a Sequence 4003, and a Size 4004.

The JNL Group ID 4001 holds the identifiers of journal groups. The Data Volume ID 4002 holds the identifiers of data volumes belonging to corresponding journal groups identified by their respective identifiers. The Sequence 4003 holds the internal identifiers of the data volumes, which are identified by their respective identifiers, within their respective journal groups.

The administrator sets correspondence between the JNL Group ID 4001, Data Volume ID 4002, and Sequence 4003 using the CLI provided by the recovery manager 1162. In the setting procedure, the administrator first creates a journal-group configuration definition file (described below) constituting a part of the system configuration definition file group stored on the local disk 1170. Then, when the administrator issues the above-described command "CreateJG-id JNLG_01", the values of the JNL Group ID 4001, Data Volume ID 4002, and Sequence 4003 associated with the designated journal group are set, based on the journal-group configuration definition file.

The Size 4004 holds the sizes of data volumes identified by their respective identifiers in the Data Volume ID 4002. When the above-described command "CreateJG-id JNLG_01" is issued, the recovery manager 1162 obtains, from the storage microprogram 1028, and sets the sizes of the data volumes identified by their respective identifiers in the Data Volume ID 4002.

FIG. 5 shows the snapshot table 5000 constituting a part of the management table 1029. The snapshot table 5000 is a table for managing snapshots taken. The snapshot table 5000 contains a JNL Group ID 5001 holding the identifiers of journal groups from which snapshots were taken, an SSVOL Group ID 5002 holding the identifiers of SSVOL groups in which snapshots are stored, a Sequence Number 5003 holding the numbers indicating the sequence in which snapshots were taken, an Acquisition Time 5004, and a Journal Application Speed 5005.

The administrator sets correspondence between the JNL Group ID 5001 and the SSVOL Group ID 5002 using the CLI provided by the recovery manager 1162. For example, the administrator issues a command "addSSVOLG-jgid JNLG_01-ssvolgid SS_01" requesting that an SSVOL group with the identifier SS_01 be associated with a journal group with the identifier JNLG_01. The value JNLG_01 is stored in the JNL Group ID 5001, and the value SS_01 is stored in the SSVOL Group ID 5002. To associate a plurality of SSVOL groups with journal groups for maintaining multiple generations of snapshots, the command described above is executed multiple times.

Every time a snapshot is taken, the storage microprogram 1028 copies a value in the Sequence Counter 3003 of the journal group table 3000 to the Sequence Number 5003.

The Acquisition Time 5004 holds the time at which a snapshot acquisition request from the recovery manager 1162 arrived at the storage device 1000. Similar to the case of the Creation Time 2104 in the journal header 2011, the values of the Acquisition Time 5004 are obtained, from the timer 1024 in the disk controller 1020 or from a snapshot acquisition request, and set by the storage microprogram 1028.

The Journal Application Speed 5005 is the speed at which a journal is applied to a snapshot. The administrator registers the Journal Application Speed 5005 when defining an SSVOL group. Alternatively, the administrator may register the speed obtained by monitoring the application of journals in a simulation performed inside the storage device 1000.

FIG. 6 shows a snapshot volume table 6000 constituting a part of the management table 1029. The snapshot volume table 6000 indicates snapshot volumes belonging to each SSVOL group. The snapshot volume table 6000 contains an SSVOL Group ID 6001, a Snapshot Volume ID 6002, a Sequence 6003, and a Size 6004.

The SSVOL Group ID 6001 holds the identifiers of SSVOL groups. The Snapshot Volume ID 6002 holds the identifiers of snapshot volumes belonging to corresponding SSVOL groups identified by their respective identifiers. The Sequence 6003 holds values, each indicating a data volume whose duplicate image is stored in the corresponding snapshot volume represented by its identifier. The duplicate image of a data volume having the same value as this in the Sequence 4003 of the data volume table 4000 is stored in the corresponding snapshot volume.

The administrator sets correspondence between the SSVOL Group ID 6001, Snapshot Volume ID 6002, and Sequence 6003 using the CLI provided by the recovery manager 1162. For example, the administrator issues a command "addSSVOL-ssvolgid SS_01-volid SVOL_01" requesting that a snapshot volume with the identifier SVOL_01 be added to an SSVOL group with the identifier SS_01. The value SS_01 is stored in the SSVOL Group ID 6001, and the value SVOL_01 is stored in the Snapshot Volume ID 6002. To set a plurality of snapshot volumes with respect to a single SSVOL group, the values of the Sequence 6003 indicating the order in which the above-described command is to be executed multiple times with different identifiers of snapshot volumes are natural numbers beginning with 1 (i.e., 1, 2, 3, . . . ), and are assigned according to the order in which the snapshots were associated with each SSVOL group (i.e., according to the order in which the above-described command was issued) within the SSVOL group.

The Size 6004 holds the sizes of snapshot volumes identified by their respective identifiers in the Snapshot Volume ID 6002. When the above-described command "addSSVOL-ssvolgid SS_01-volid SVOL_01" has been issued, the recovery manager 1162 obtains, from the storage microprogram 1028, and sets the sizes of the snapshot volumes identified by their respective identifiers in the Snapshot Volume ID 6002.

FIG. 7 shows a journal volume table 7000 constituting a part of the management table 1029. The journal volume table 7000 shows journal volumes associated with each journal group. The journal volume table 7000 contains a JNL Group ID 7001 holding the identifiers of journal groups, a JNL Volume ID 7002 holding the identifiers of journal volumes associated with each of the journal groups, a Capacity 7003 holding the storage capacity of each of the journal volumes, and a Sequence 7004.

Values in the Sequence 7004 specify the order in which the journal volumes associated with each journal group are to be used. Referring to FIG. 7, for example, in a journal group JNLG_01, the storage microprogram 1028 uses a journal volume J-VOL_01 first, and then uses a journal volume J-VOL_03. When the last journal volume has been used up, the storage microprogram 1028 reuses the first journal volume and other journal volumes sequentially in a repetitive manner.

The administrator sets correspondence between the JNL Group ID 7001 and the JNL Volume ID 7002 using the CLI provided by the recovery manager 1162. For example, the administrator issues a command "addJVOL-jgid JNLG__01-jvolid J-VOL__01" requesting that a journal volume with the identifier J-VOL_01 be added to a journal group with the identifier JNLG_01. The value J-VOL_01 is stored in the JNL Group ID 7001, and the value JNLG_01 is stored in the JNL Volume ID 7002. To associate a plurality of journal volumes with a single journal group, the above-described command is executed multiple times with different journal volume IDs. The values of the Sequence 7004 are natural numbers beginning with 1 (i.e., 1, 2, 3, ... ) and are assigned according to the order in which the journal volumes were associated with each journal group (i.e., according to the order in which the above-described command was issued) within the journal group. The values of the Capacity 7003 are the storage capacities of the journal volumes identified by their respective identifiers in the JNL Volume ID 7002. When the above-described command "addJVOL-jgid JNLG__01-jvolid J-VOL__01" has been issued, these storage capacities are obtained, from the storage microprogram 1028, and set by the recovery manager 1162.

Figure 8:
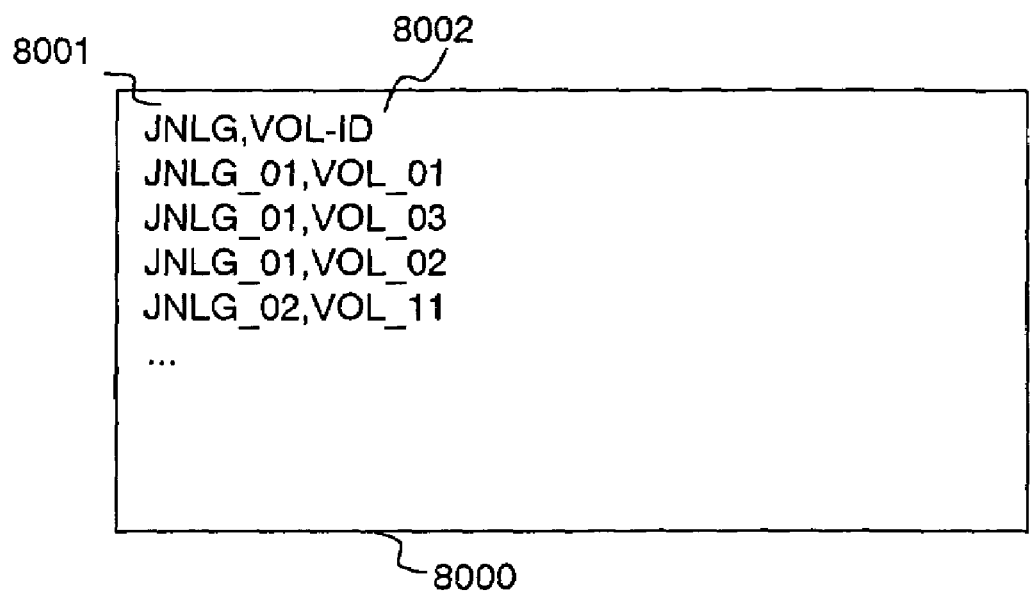
FIG. 8 shows an exemplary journal-group configuration definition file of the first embodiment.

FIG. 8 shows an exemplary journal-group configuration definition file 8000 stored on the local disk 1170. The journal-group configuration definition file 8000 is used to define journal groups and indicates which data volume belongs to which journal group. In the journal-group configuration definition file 8000, a set of values of JNLG 8001 and VOL-ID 8002 appears on the second line and each line thereafter.

The values of the JNLG 8001 are the identifiers of journal groups. The values of the VOL-ID 8002 are the identifiers of data volumes belonging to journal groups identified by their respective identifiers. When journal groups are defined, the JNLG 8001 is registered in the JNL Group ID 4001 of the data volume table 4000, and the VOL-ID 8002 is registered in the Data Volume ID 4002 of the data volume table 4000. The values of the Sequence 4003 are natural numbers beginning with 1 (i.e., 1, 2, 3, ... ) and are assigned according to the order in which, in the journal-group configuration definition file 8000, the journal volumes were associated with each journal group (i.e., from the top of the file) within the journal group.

FIG. 9 and FIG. 10 are exemplary tables constituting a part of the snapshot management information 1264. FIG. 9 shows an application table 9000 constituting a part of the snapshot management information 1264. The application table 9000 is a table for storing information to be used for backup management. The application table 9000 contains an Application ID 9001 holding the identifiers of backup target applications, a Host Address 9002 holding the identifiers (such as the IP addresses) of host computers on which the applications run, a Storage ID 9003 holding the identifiers (such as the serial numbers) of storage devices to which journal groups used by the applications belong, a JNL Group ID 9004 holding the identifiers of the journal groups used by the applications, a Monitoring Interval 9005, a Requested RTO 9006, a Requested RTO Application Period 9007, an RTO Adjustment Start Threshold 9008, and an RTO Adjustment End Value 9009.

The Monitoring Interval 9005 holds the intervals of monitoring the storage states of snapshots and journals. The Requested RTO 9006 holds RTOs requested by the administrator. While the values of the Monitoring Interval 9005 and Requested RTO 9006 are specified in seconds in the present embodiment, they may be specified in different units in other embodiments.

The Requested RTO Application Period 9007 holds the periods of time, up to the current time, during which requested RTOs specified in the Requested RTO 9006 are to be applied. While the values of the Monitoring Interval 9005 are specified in hours in the present embodiment, they may be specified in different units in other embodiments. If no application period is to be specified, a value of "−1" indicating an unlimited duration is set.

The RTO Adjustment Start Threshold 9008 holds thresholds that trigger the updating of the latest snapshots for meeting the requested RTOs. The latest snapshot is updated when a recovery point after the latest snapshot exceeds a threshold. The RTO Adjustment End Value 9009 holds RTOs for terminating the updating of the latest snapshots. Each of the RTOs is used to determine the point in time up to which the latest snapshot is to be updated.

The values of the Application ID 9001, Host Address 9002, Monitoring Interval 9005, Requested RTO 9006, Requested RTO Application Period 9007, RTO Adjustment Start Threshold 9008, and RTO Adjustment End Value 9009 are set by the administrator through the GUI provided by the configuration program 1265.

The Storage ID 9003 indicates storage devices, and the JNL Group ID 9004 indicates journal groups belonging to each storage device and used by applications. The configuration program 1265 obtains such information from the information gathering agent 1161.

FIG. 10 shows a storage table 10000 constituting a part of the snapshot management information 1264. The storage table 10000 contains a Storage ID 10001 and an IP Address 10002. The Storage ID 10001 holds identifiers, such as serial numbers, for uniquely identifying storage devices. The IP Address 10002 holds the network addresses of management I/Fs. The administrator sets the values of both the Storage ID 10001 and the IP Address 10002 through the GUI provided by the configuration program 1265. The tables described above are the group of tables constituting the snapshot management information 1264.

(2) Operation of First Embodiment

Figure 11A:
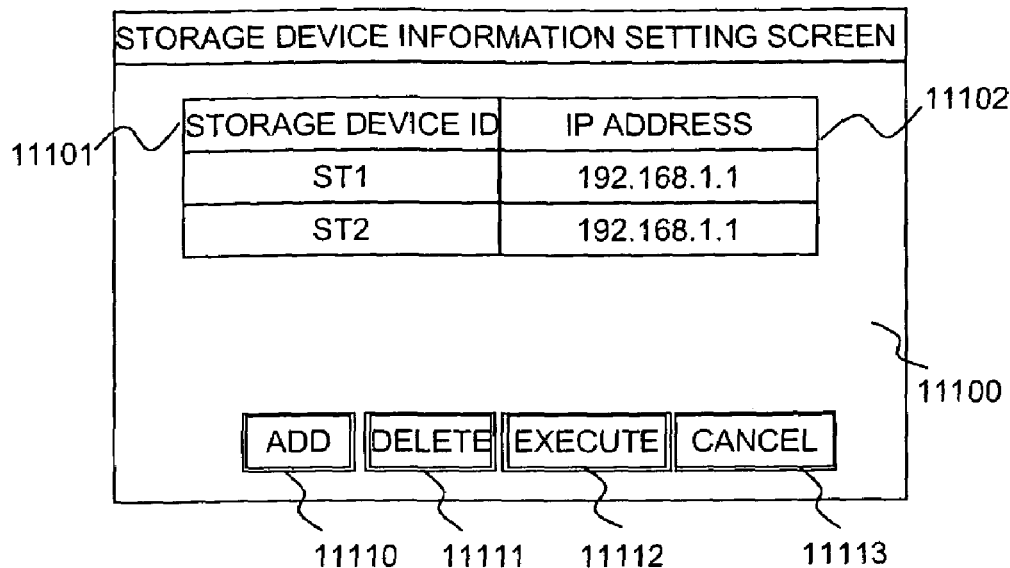
FIG. 11A shows an exemplary storage-system-information setting screen displayed by a configuration program of the first embodiment.
Figure 11B:
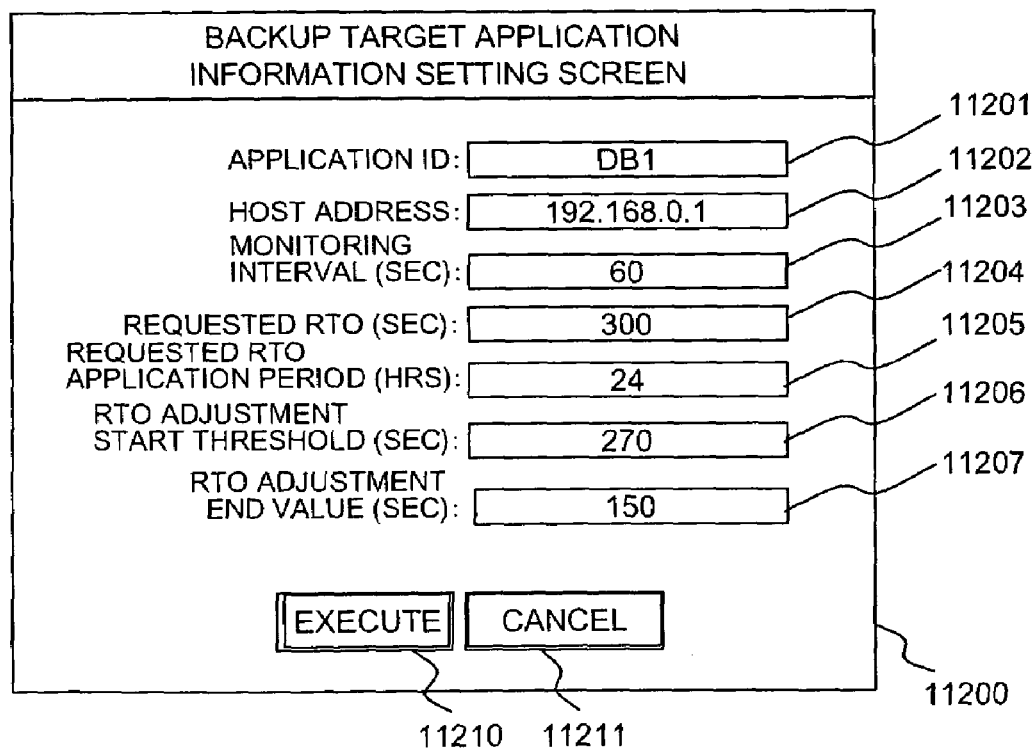
FIG. 11B shows an exemplary backup-target-application-information setting screen of the first embodiment.

First, an exemplary operation of the configuration program 1265 in the management computer 1200 will be described. FIG. 11A and FIG. 11B show GUIs provided by the configuration program 1265 for configuring system settings. A storage-device-information setting screen 11100 in FIG. 11A is displayed when the administrator sends a request to the configuration program 1265 using the CLI or the like for setting information about storage devices. A Storage Device ID 11101 provides fields for entering IDs, such as serial numbers, for identifying storage devices. The IP Address 11102 provides fields for entering IP addresses for connection to the management I/Fs of the storage devices shown in the Storage Device ID 11101.

The storage-device-information setting screen 11100 provides an ADD button 11110, a DELETE button 11111, an EXECUTE button 11112, and a CANCEL button 11113.

In the storage-device-information setting screen 11100, the Storage Device ID 11101, the IP Address 11102, and the DELETE button 11111 constitute a single row. Pressing the DELETE button 11111 deletes a row to which the DELETE button 11111 belongs from the storage-device-information setting screen 11100. Pressing the ADD button 11110 adds a row to the storage-device-information setting screen 11100. Pressing the CANCEL button 11113 causes the configuration program 1265 to end without doing anything. Pressing the EXECUTE button 11112 causes the configuration program 1265 to set a pair of values of the Storage Device ID 11101 and IP Address 11102 into the Storage ID 10001 and IP Address 10002 of the storage table 10000, respectively.

A backup-target-application-information setting screen 11200 in FIG. 11B is displayed when the administrator sends a request to the configuration program 1265 using the CLI or the like for setting information about a backup target application. An Application ID 11201 is a field for entering an ID for uniquely identifying an application on which a backup operation is to be performed. A Host Address 11202 is a field for entering the identifier, such as the IP address, of a host computer on which a backup target application runs. A Monitoring Interval 11203 is a field for entering the interval of monitoring the storage states of snapshots and journals. A Requested RTO 11204 is a field for entering an RTO requested by the administrator. A Requested-RTO Application Period 11205 is a field for entering the hours, up to the current time, during which the requested RTO in the Requested-RTO Application Period 11205 is to be applied. An RTO-Adjustment Start Threshold 11206 is a field for entering a threshold that triggers the updating of the latest snapshot for meeting the requested RTO. An RTO-Adjustment End Value 11207 is a field for entering an RTO for terminating the updating of the latest snapshot.

While values in the Monitoring Interval 11203, Requested RTO 11204, RTO-Adjustment Start Threshold 11206, and RTO-Adjustment End Value 11207 are specified in seconds in the present embodiment, they may be specified in different units. While a value in the Requested-RTO Application Period 11205 is specified in hours, they may be specified in different units. If no application period is to be specified, a value of "−1" indicating an unlimited duration is set in this field.

The backup-target-application-information setting screen 11200 provides an EXECUTE button 11210 and a CANCEL button 11211. Pressing the CANCEL button 11211 causes the configuration program 1265 to end without doing anything. Pressing the EXECUTE button 11210 causes the configuration program 1265 to set information according to the flow shown in FIG. 12.

Figure 12:
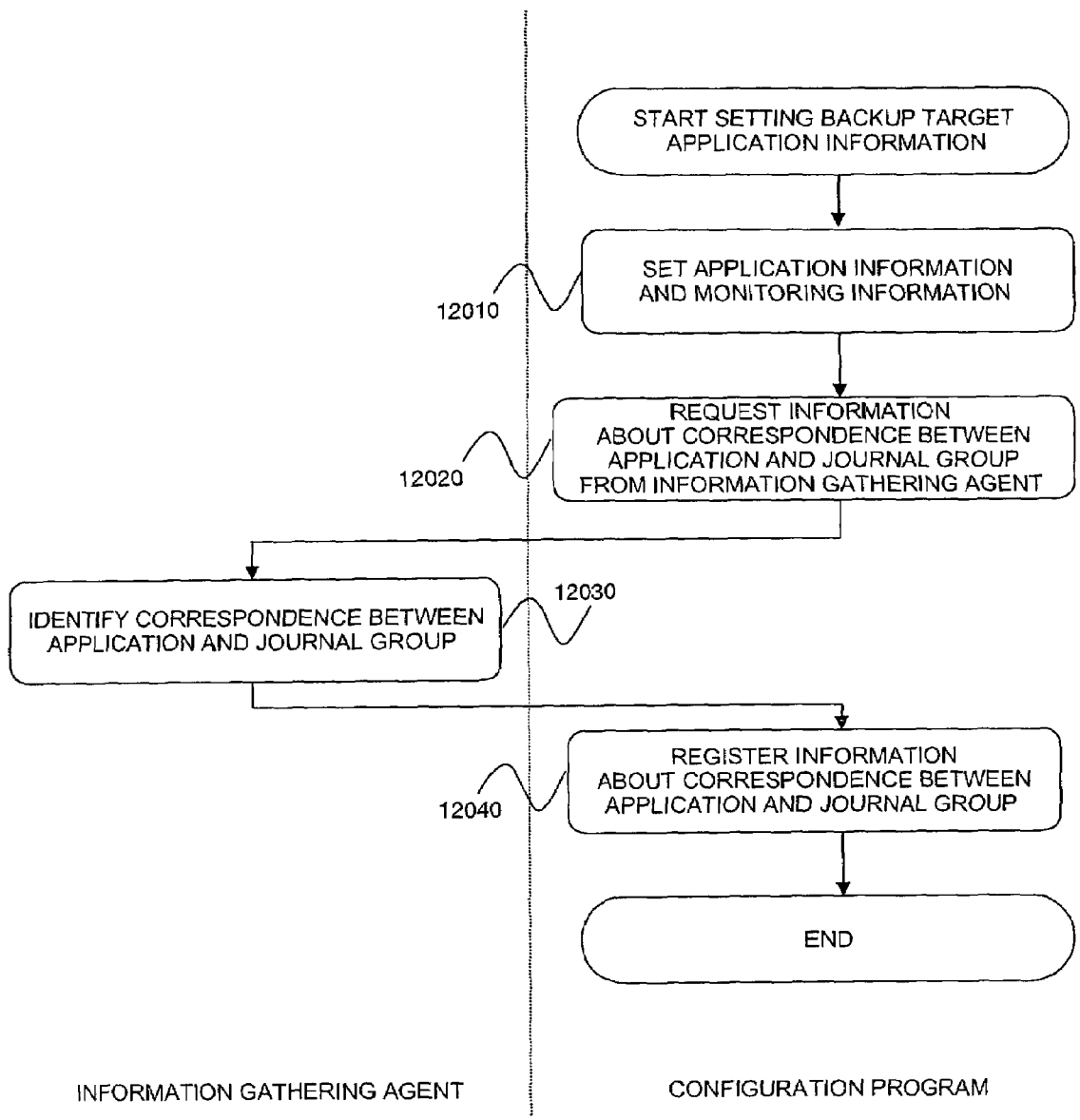
FIG. 12 shows the operation of backup-target-application-information setting performed by the configuration program of the first embodiment.

FIG. 12 shows the operation when the EXECUTE button 11210 is pressed on the screen in FIG. 11B. With reference to FIG. 12, the following describes the operation of the configuration program 1265 and information gathering agent 1161 invoked by the configuration program 1265 in the middle of the process.

First, the configuration program 1265 assigns a value in the Application ID 11201 to the Application ID 9001 of the application table 9000, assigns a value in the Host Address 11202 to the Host Address 9002 of the application table 9000, assigns a value in the Monitoring Interval 11203 to the Monitoring Interval 9005 of the application table 9000, assigns a value in the Requested RTO 11204 to the Requested RTO 9006 of the application table 9000, assigns a value in the Requested-RTO Application Period 11205 to the Requested RTO Application Period 9007 of the application table 9000, assigns a value in the RTO-Adjustment Start Threshold 11206 to the RTO Adjustment Start Threshold 9008, and assigns a value in the RTO-Adjustment End Value 11207 to the RTO Adjustment End Value 9009 (step S12010).

Next, the configuration program 1265 connects to the host computer 1100 using the Host Address 9002 and requests information about correspondence between an application and a journal group from the information gathering agent 1161 (step S12020).

Based on the system configuration definition file group stored on the local disk 1170, the information gathering agent 1161 identifies a data volume used by the application, a journal group to which the data volume belongs, and a storage device to which the journal group belongs. Then, the information gathering agent 1161 returns, to the configuration program 1265, the identifier of the application, the identifier of the journal group to which the data volume used by the application belongs, and the identifier of the storage device to which the journal group belongs (step S12030).

The configuration program 1265 assigns, to the JNL Group ID 9004, the identifier of the journal group to which the data volume used by the application belongs. Moreover, the configuration program 1265 assigns, to the Storage ID 9003, the identifier of the storage device to which the journal group belongs (step S12040).

Thus, the operation of the configuration program 1265 ends.

Figure 13:
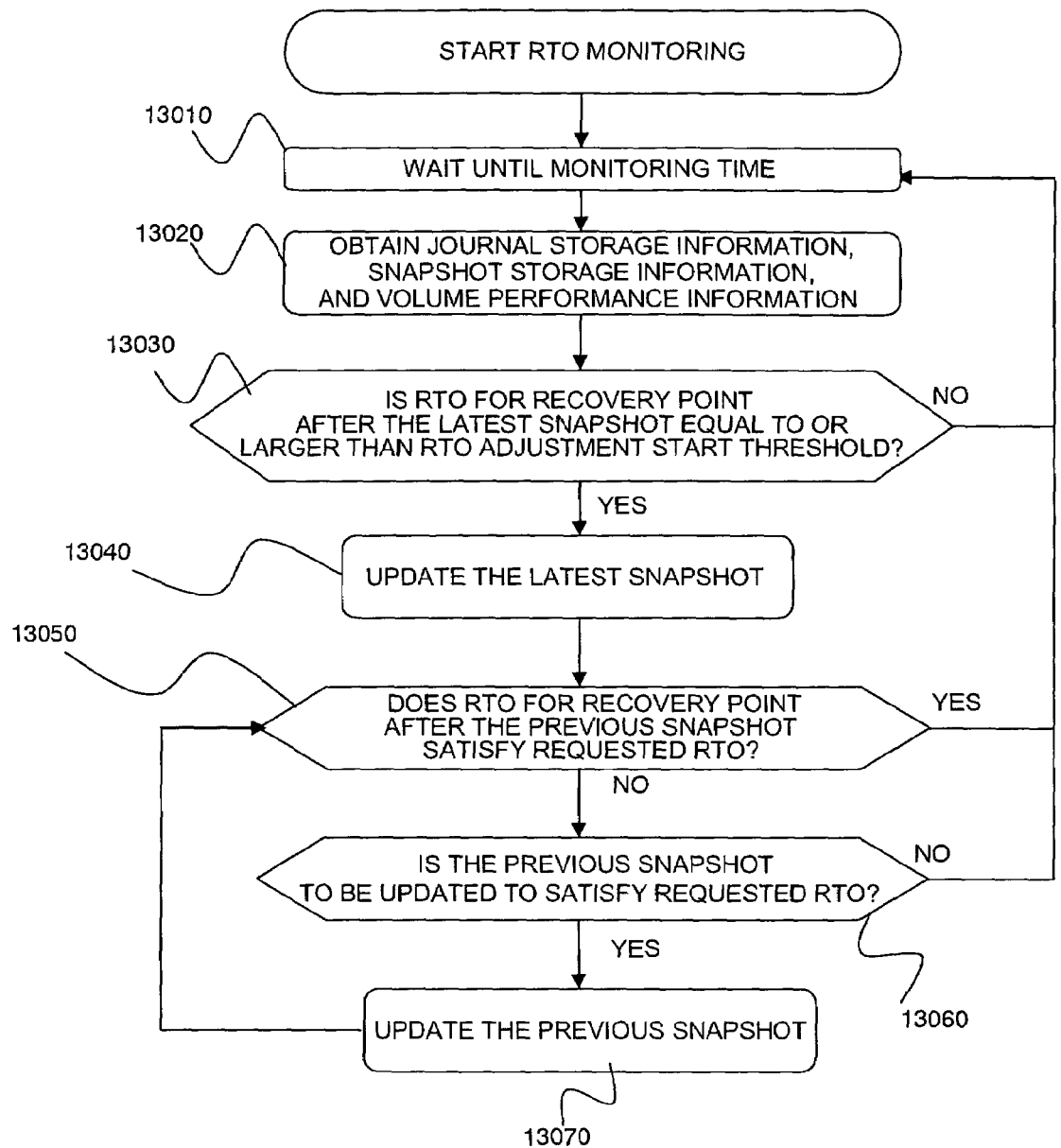
FIG. 13 shows RTO monitoring performed by a snapshot management program 1263 of the first embodiment.

Next, with reference to FIG. 13, the following describes an example of the operation of the snapshot management program 1263. The snapshot management program 1263 performs RTO monitoring at intervals specified in the Monitoring Interval 9005 of the application table 9000. The snapshot management program 1263 waits until the monitoring time is reached (step S13010).

When the monitoring time is reached, the snapshot management program 1263 obtains, from the storage table 10000, the IP address of the storage device 1000 used by the backup target application. The snapshot management program 1263 connects to the storage device 1000 using this IP address and obtains, from the storage microprogram 1028, a list in the journal header 2011 and information contained in the snapshot table 5000 (step S13020).

The snapshot management program 1263 determines, using the obtained information, whether an RTO for a recovery point after the recovery point of the latest snapshot is equal to or larger than the RTO Adjustment Start Threshold 9008 (step S13030). In this step, a snapshot with the largest Sequence Number 5003 is identified as the latest snapshot. Next, a journal with the Sequence Number 2105 larger than the Sequence Number 5003 of the latest snapshot is identified as an After journal having a recovery point after the recovery point of the latest snapshot. The total of the Data Length 2103 in the journal header 2011 of each identified After journal is determined. Then, the amount of time required for applying this total length of journal data to the latest snapshot at the Journal Application Speed 5005 is determined. In the present embodiment, this can be determined by dividing the above-described total length of journal data by the Journal Application Speed 5005. Then, it is determined whether the amount of time determined is equal to or larger than the RTO Adjustment Start Threshold 9008.

If it is determined in step S13030 that an RTO for a recovery point after the latest snapshot is less than the RTO Adjustment Start Threshold 9008, the process returns to step S13010, where the snapshot management program 1263 waits for the next monitoring time.

On the other hand, if it is determined in step S13030 that an RTO for a recovery point after the latest snapshot is equal to or larger than the RTO Adjustment Start Threshold 9008, the snapshot management program 1263 requests the storage microprogram 1028 to update the latest snapshot (step S13040). In this step, first, the maximum amount of application data applicable within the time period indicated by the RTO Adjustment End Value 9009 is determined from the Journal Application Speed 5005 for the latest snapshot. In the present embodiment, this can be determined by multiplying the Journal Application Speed 5005 by the RTO Adjustment End Value 9009. Then, with respect to the journal headers of the respective After journals identified in step S13030, the Data Length 2103 is added one by one in descending order of the Sequence Number 2105. When the above-described maximum amount of application data has been exceeded, a journal header having the data length that was last added is identified. Then, the configuration program 1265 requests the storage microprogram 1028 to sequentially apply the After journals to the latest snapshot until the Sequence Number 2105 of the identified journal header is reached. After updating the latest snapshot, the storage microprogram 1028 copies the Creation Time 2104 of the last-applied After journal to the Acquisition Time 5004 of the latest snapshot, and copies the Sequence Number 2105 of the last-applied After journal to the Sequence Number 5003.

Hereinafter, a snapshot having a recovery point that is one-generation older than that of the previously updated snapshot is referred to as "the previous snapshot". In the next step, it is determined whether an RTO for a recovery point after the recovery point of the previous snapshot satisfies the RTO requested by the administrator (step S13050). In this step, a journal having the Sequence Number 2105 that is larger than that of the previous snapshot and is equal to or less than that of the previously updated snapshot is identified as an After journal having a recovery point after the recovery point of the previous snapshot, based on the journal header list obtained in step S13020. Then, similar to the processing in step S13030, the total of the data length of each journal header is determined, and the amount of time required for the application of this total length of journal data is determined. If the amount of time determined is less than or equal to the Requested RTO 9006, the RTO requested by the administrator is satisfied.

If it is determined in step S13050 that the RTO requested by the administrator is satisfied, the process returns to step S13010, where the snapshot management program 1263 waits for the next monitoring time.

On the other hand, if it is determined in step S13050 that the RTO requested by the administrator is not satisfied, it is determined whether to update the previous snapshot to satisfy the requested RTO (step S13060). In this step, with respect to the journal headers of the respective After journals identified in step S13050, it is determined whether there is a journal having the Creation Time 2104 that is after the time given by subtracting the specified Requested RTO Application Period 9007 from the current time. If there is such a journal, it is determined that the previous snapshot is to be updated to satisfy the requested RTO.

If it is determined in step S13060 that the previous snapshot is not to be updated, the process returns to step S13010, where the snapshot management program 1263 waits for the next monitoring time.

If it is determined in step S13060 that the previous snapshot is to be updated, the snapshot management program 1263 requests the storage microprogram 1028 to update the previous snapshot (step S13070). In this step, first, the maximum amount of application data applicable within the time period indicated by the Requested RTO 9006 is determined from the Journal Application Speed 5005 for the previous snapshot. Then, with respect to the journal headers of the respective After journals identified in step S13050, each data length is added one by one in descending order of the Sequence Number 2105. When the above-described maximum amount of application data has been exceeded, a journal header having the data length that was last added is identified. Then, the configuration program 1265 requests the storage microprogram 1028 to sequentially apply the After journals to the previous snapshot until the sequence number of the identified journal header is reached. After updating the previous snapshot, the storage microprogram 1028 copies the Creation Time 2104 of the last-applied After journal to the Acquisition Time 5004 of the latest snapshot, and copies the Sequence Number 2105 of the last-applied After journal to the Sequence Number 5003.

Upon completion of step S13070, the process returns to step S13050, where it is determined whether an RTO for a recovery point after the second previous snapshot satisfies the RTO requested by the administrator.

These are the operations of the snapshot management program 1263.

The operation in the present embodiment is based on the presumption that the total size of the group of journal volumes 1013 associated with the journal group 1014 is less than the sum of the maximum amount of application data applicable within the time period indicated by the RTO Adjustment End Value 9009 and the product of a value given by subtracting one from the number of SSVOL groups associated with the journal group 1014 and the maximum amount of application data applicable within the time period indicated by the Requested RTO 9006. In other words, the operation in the present embodiment is based on the presumption that the oldest snapshot will not be updated. However, in other embodiments, if the above-described presumption cannot be met, there may be additional steps immediately before step S13070. In these steps, it is first determined whether the previous snapshot is the oldest snapshot. If the previous snapshot is the oldest one, the snapshot management program 1263 requests the storage microprogram 1028 to create a corresponding Before journal while applying an After journal to the previous snapshot to update it, thereby maintaining recovery points before the recovery point of the oldest snapshot. It cannot be assured however that these maintained recovery points satisfy the requested RTO.

While the present embodiment is based on the presumption that there is only a single requested RTO, there may be cases, in other embodiments, where there are a plurality of requested RTOs. Examples include the case where data at recovery points within the latest ten hours is required to be recovered within ten minutes, while data at recovery points of more than ten hours ago is required to be recovered within twenty minutes. Such a plurality of requests can be accommodated by expanding the application table 9000. First, the application table 9000 is expanded to accommodate a plurality of requested RTOs and their corresponding requested RTO application periods. For example, sets of columns, such as "Requested RTO 1 and Requested RTO Application Period 1" and "Requested RTO 2 and Requested RTO Application Period 2" may be added to the application table 9000. Then, in step S13050 in FIG. 13, the snapshot management program 1263 identifies, with respect to each After journal having a recovery point after the recovery point of the previous snapshot, a requested RTO application period to which the After journal belongs. Then, it is determined whether data at the latest recovery point within each requested RTO application period can be recovered within its corresponding requested RTO. Similar to the processing described above, this determination can be made on the basis of the Data Length 2103 of the journal header 2011 and on the Journal Application Speed 5005. In step S13070, the maximum amount of application data applicable within each requested RTO application period is determined. Then, with respect to each After journal belonging to each requested RTO application period, the Data Length 2103 is added one by one in descending order of the Sequence Number 2105. When the above-described maximum amount of application data has been exceeded, an After journal having the data length that was last added is identified. Then, the configuration program 1265 requests the storage microprogram 1028 to sequentially apply the After journals to the previous snapshot until the After journal having the latest recovery point is reached. As described above, the expansion of processing allows a plurality of requested RTOs to be accommodated.

As described above, in the first embodiment, data at any point in time can be recovered within requested RTOs, since the time required for journal application to a snapshot is consistently below a certain level.

Second Embodiment (1) System Configuration of Second Embodiment

Figure 14:
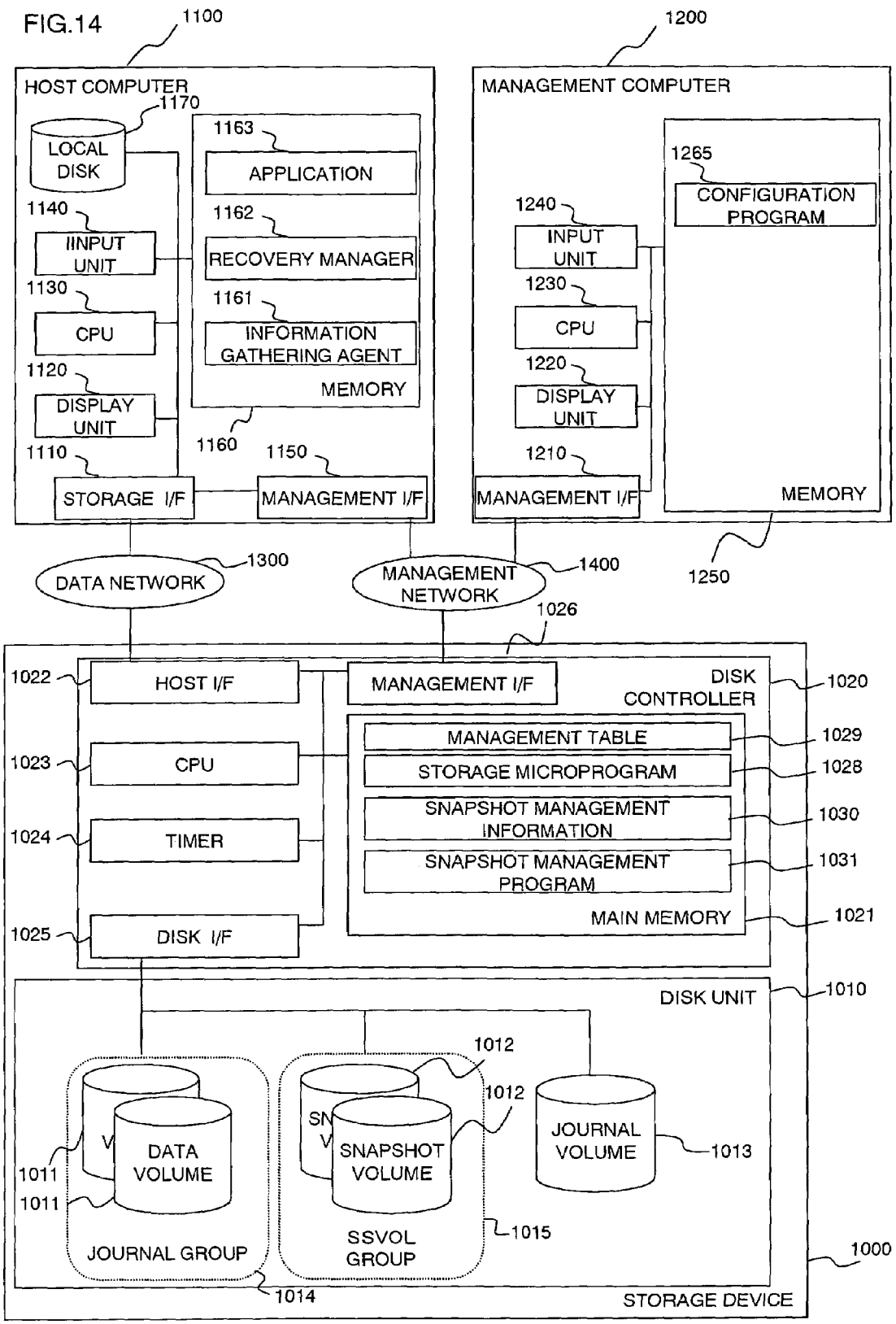
FIG. 14 shows a system configuration according to a second embodiment of the present invention.

FIG. 14 shows the system configuration of the second embodiment. The system configuration of the second embodiment is substantially the same as that of the first embodiment, and the following mainly describes the differences therebetween. In the present embodiment, snapshot management information 1030 and a snapshot management program 1031 are stored in the main memory 1021 of the storage device 1000. Instead, in the present embodiment, the snapshot management information 1264 and the snapshot management program 1263 are not stored in the memory 1250 of the management computer 1200.

In the present embodiment, the Storage ID 9003 may be deleted from the application table 9000. The storage table 10000 may also be deleted. Accordingly, the storage device information setting screen 11100 (FIG. 11A) displayed by the configuration program 1265 becomes no longer needed.

(2) Operation of Second Embodiment

The operation of the second embodiment is substantially the same as that of the first embodiment, and the following mainly describes the differences therebetween. First, the operation of the configuration program 1265 will be described with reference to FIG. 11B and FIG. 12. In the present embodiment, a field for entering an IP address for connection to the management I/F 1026 of the storage device is added to the backup-target-application-information setting screen 11200 in FIG. 11B. Hereinafter, this field will be referred to as "Storage IP Address".

Next, a difference in operation when the EXECUTE button 11210 in FIG. 11B is pressed will be described with reference to FIG. 12. In the present embodiment, in step S12010 and step S12040, the configuration program 1265 connects to the storage device 1000 using a value entered in the Storage IP Address to set each value.

Next, the operation of the snapshot management program 1031 will be described with reference to FIG. 13. In the first embodiment, a request for the acquisition of journal storage information and snapshot storage information, and a request to the storage microprogram 1028 are sent via the management network 1400. However, in the present embodiment, such a request is directly sent to the storage microprogram 1028.

In the present embodiment, the snapshot management program 1031 obtains journal storage information and snapshot storage information at intervals specified in the Monitoring Interval 9005 to monitor whether a requested RTO is satisfied. In other embodiments, monitoring may be performed when the storage microprogram 1028 has created an After journal upon arrival of a write from the host computer 1100.

In the second embodiment, similar to the first embodiment, data at any point in time can be recovered within an RTO requested by the administrator, since the time required for journal application to a snapshot is consistently below a certain level.

Third Embodiment (1) System Configuration of Third Embodiment

Figure 15:
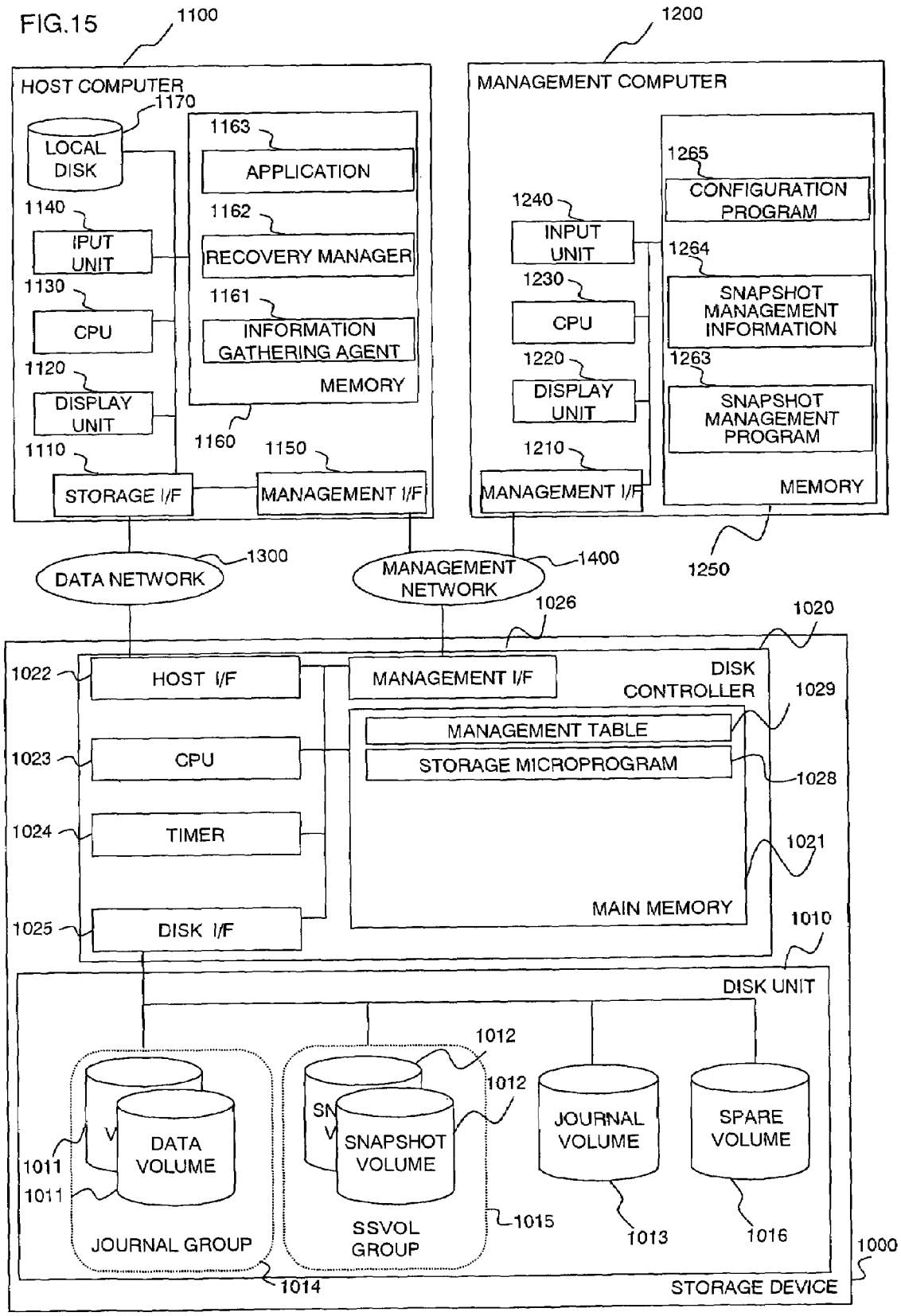
FIG. 15 shows a system configuration according to a third embodiment of the present invention.

FIG. 15 shows the system configuration of the third embodiment. The system configuration of the third embodiment is substantially the same as that of the first embodiment, and the following mainly describes the differences therebetween. In the present embodiment, a spare volume 1016 is added to the disk unit 1010.

The spare volume 1016 is an unused logical volume and can be used for constituting an SSVOL group. For convenience of explanation, FIG. 1 shows one journal group 1014 and one journal volume 1013. However, the present invention does not limit the number of each of these to one.

FIG. 16 shows an exemplary spare volume management table 16000 included in the management table 1029 of the present embodiment. The spare volume management table 16000 is a table for managing the spare volume 1016. The spare volume management table 16000 contains a Spare Volume ID 16001 and a Size 16002.

The Spare Volume ID 16001 holds identifiers for identifying respective spare volumes. The Size 16002 holds the sizes of the spare volumes identified by their respective identifiers in the Spare Volume ID 16001.

The administrator sets values of the Spare Volume ID 16001 using the CLI provided by the recovery manager 1162. For example, the administrator issues a command "addSpareVol SPARE_VOL_01" requesting that a volume with the identifier SPARE_VOL_01 be registered as a spare volume. The value SPARE_VOL_01 is stored in the Spare Volume ID 16001. In this case, the value in the Size 16002 is the size of the volume identified by SPARE_VOL_01, and is obtained, from the storage microprogram 1028, and set by the recovery manager 1162 when the above-described command "addSpareVol SPARE_VOL 01" has been issued.

(2) Operation of Third Embodiment

Figure 17:
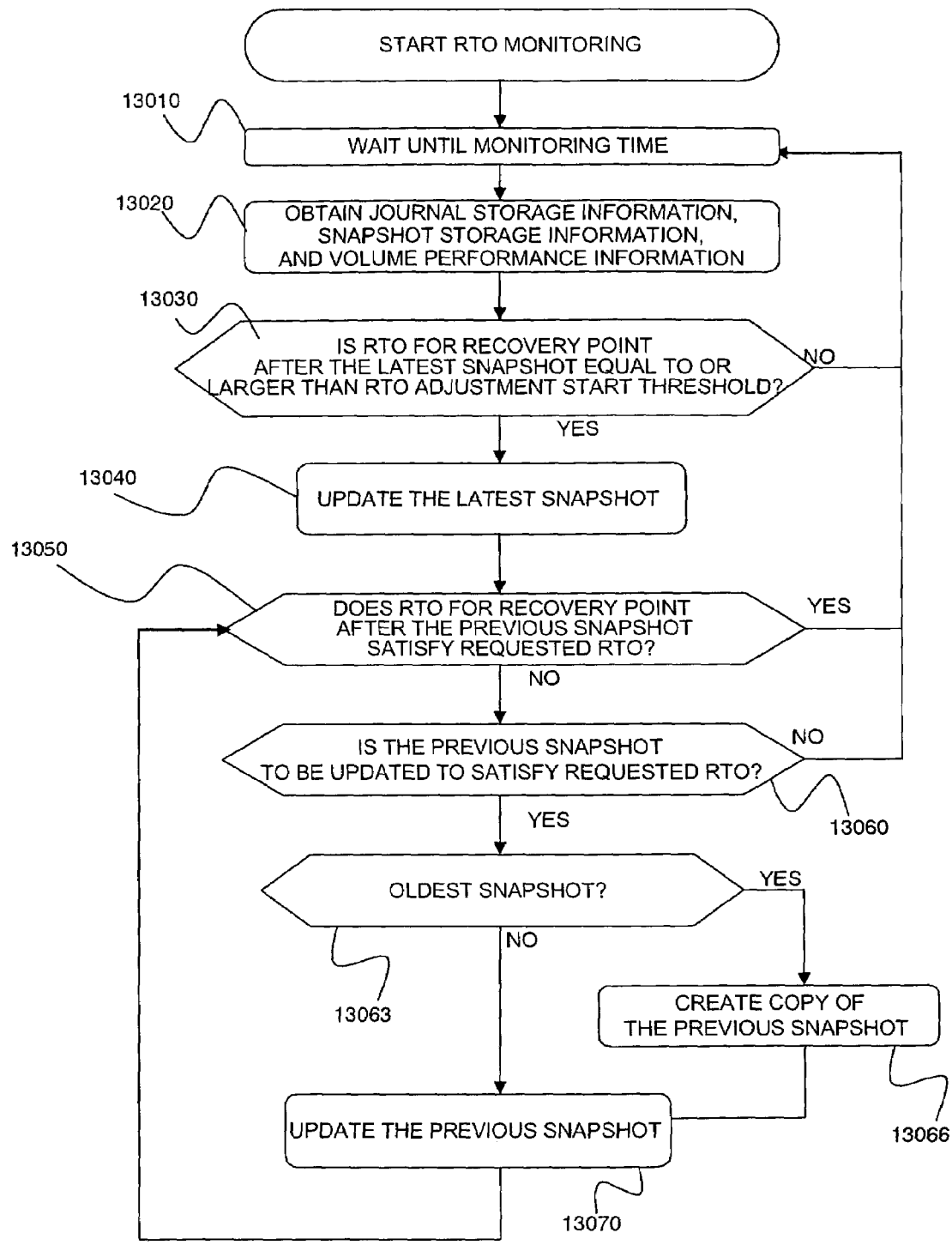
FIG. 17 shows RTO monitoring performed by a snapshot management program 1263 of the third embodiment.

The operation of the third embodiment is substantially the same as that of the first embodiment, and the following mainly describes the differences therebetween. In the present embodiment, only the operation of the snapshot management program 1263 is different from that of the first embodiment. With reference to FIG. 17, an example of the operation of the snapshot management program 1263 will be described.

The operation of the snapshot management program 1263 in the present embodiment is substantially the same as that in the first embodiment. In the present embodiment, step S13063 and step S13066 are added to the process before step S13070, where the previous snapshot is updated in response to the determination in step S13060.

In step S13063, it is determined whether the previous snapshot is the oldest snapshot (step S13063). In this step, the snapshot management program 1263 refers to the snapshot table 5000 to determine whether there is a snapshot with a sequence number less than or equal to that of the previous snapshot. If there is such a snapshot, the snapshot management program 1263 determines that the previous snapshot is not the oldest one.

If it is determined in step S13063 that the previous snapshot is not the oldest snapshot, the previous snapshot is updated (step S13070). The subsequent steps will not be described here, as they are the same as those in the first embodiment.

On the other hand, if it is determined in step S13063 that the previous snapshot is the oldest snapshot, a copy of the previous snapshot is created (step S13066). In this step, first, the snapshot management program 1263 refers to the snapshot volume table 6000 to obtain information about the snapshot volumes that constitute an SSVOL group and in which the previous snapshot is stored. Specifically, lists of values in the Sequence 6003 and Size 6004 are obtained. Next, spare volumes with a size equal to or larger than the Size 6004 are retrieved from the spare volume management table 16000 in ascending order of the Sequence 6003. Then, after connecting to the management I/F 1150 of the host computer 1100 using the Host Address 9002 in the application table 9000, the snapshot management program 1263 creates an SSVOL group and adds, using the CLI provided by the recovery manager, spare volumes according to the order in which they were retrieved. For example, such a command as "addSS-VOL-ssvolgid M_SS_01-volid SPARE_VOL_01" is issued multiple times with different spare volume IDs by the number of spare volumes retrieved. Then, the snapshot management program 1263 executes the CLI provided by the recovery manager to associate this SSVOL group with a journal group. For example, such a command as "addSSVOLG-jgid JNLG_01-ssvolgid M_SS_01" is issued. Then last, the snapshot management program 1263 requests the storage microprogram 1028 to copy the previous snapshot to the newly created SSVOL group. In response, the storage microprogram 1028 performs copying of the snapshot volume and copying of the Sequence Number 5003 and Acquisition Time 5004 in the snapshot table 5000. Thus, a copy of the previous snapshot is created.

Then, the process proceeds to step S13070, where the previous snapshot is updated. The subsequent processing will not be described here, as it is the same as that in the first embodiment.

These are the operations of the snapshot management program 1263.

The operation in the present embodiment is based on the presumption that, in step S13066, an SSVOL group can be created without exception. However, in other embodiments, if the above-described presumption cannot be met due to insufficient spare volumes or the like, an additional step may be provided immediately before step S1366 for determining whether the remaining spare volumes are sufficient for creating an SSVOL group. If it is determined that the remaining spare volumes are insufficient, step S13066 may be skipped. Since a copy of the previous snapshot cannot be made in this case, the snapshot management program 1263 may inform the administrator using a simple network management protocol (SNMP) trap that it is possible that the requested RTO cannot be met.

In the third embodiment, similar to the first embodiment, data at any point in time can be recovered within an RTO requested by the administrator, since the time required for journal application to a snapshot is consistently below a certain level.

Fourth Embodiment

Next, a system that performs backup and recovery operations, based on the journaling technique, by a method different from those used in the first to third embodiments will be described as the fourth embodiment. In the present embodiment, data written by the host computer is not maintained as an After journal. Instead, the system of the present embodiment saves a portion of data to be overwritten by the host computer, and uses this data (i.e., the equivalent of a Before journal in the first to third embodiments) to perform backup and recovery operations based on the journaling technique. The system configuration and operation of the present embodiment will now be described.

(1) System Configuration of Fourth Embodiment

The system configuration of the fourth embodiment is the same as that of the third embodiment. However, in the present embodiment, when a write from the host computer 1100 to the data volume 1011 belonging to the journal group 1014 occurs, the storage microprogram 1028 saves a series of data items to be overwritten by the host computer 1100, assigns appropriate sequence numbers to the series of data items according to the order in which they were saved, and stores the series of data items as Before journals in the journal volume 1013 associated with the journal group 1014.

Moreover, in the present embodiment, to recover data at a recovery point after the latest snapshot, a Before journal is applied to the data volume 1011 or to the snapshot of the data volume 1011 at the point of recovery.

(2) Operation of Fourth Embodiment

Figure 18:
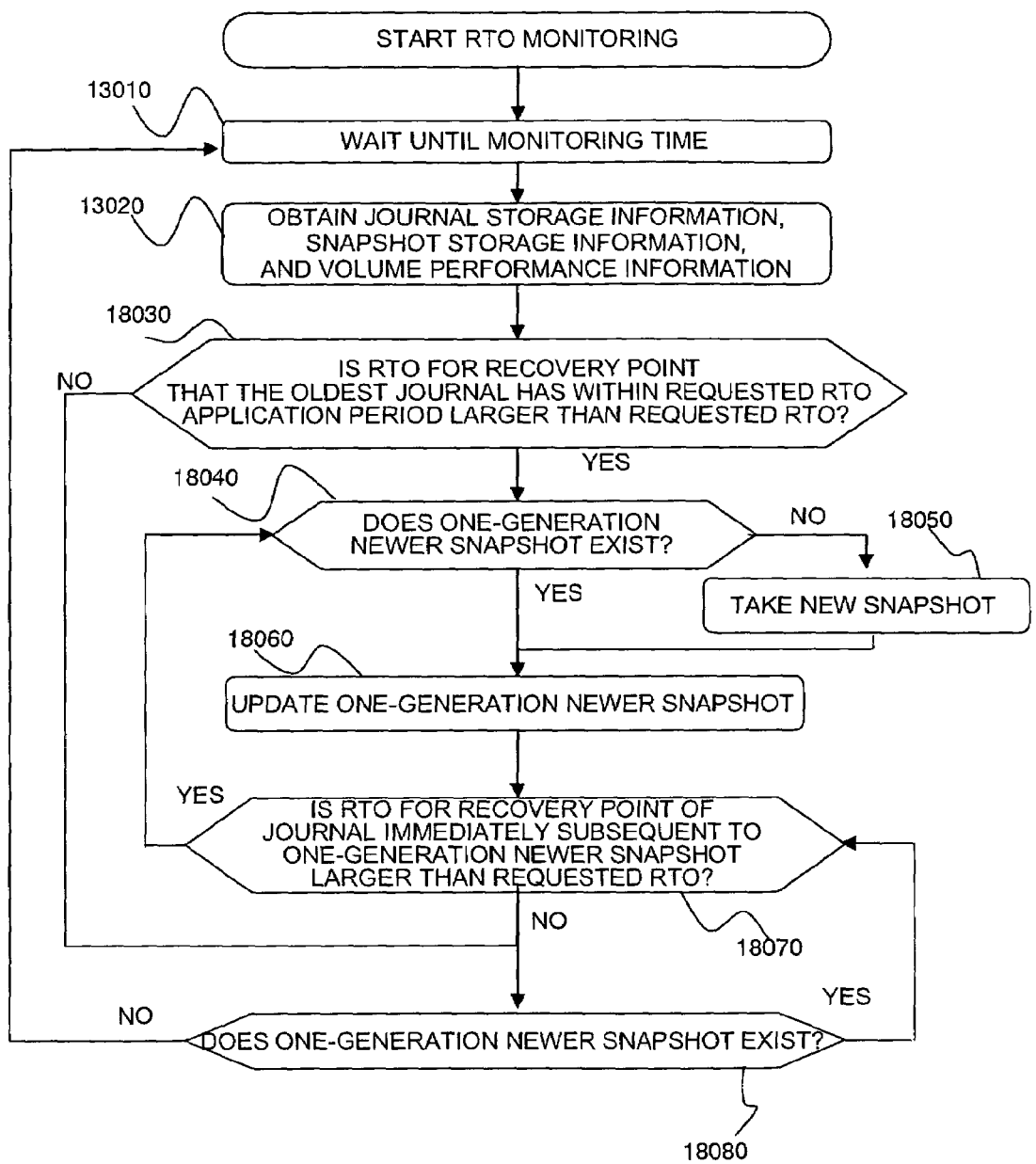
FIG. 18 shows RTO monitoring performed by a snapshot management program 1263 of a fourth embodiment of the present invention.

The operation of the fourth embodiment is substantially the same as that of the third embodiment, and the following mainly describes the differences therebetween. In the present embodiment, only the operation of the snapshot management program 1263 is different from that of the third embodiment. With reference to FIG. 18, the operation of the snapshot management program 1263 will be described. The operations in steps S13010 and S13020 of the present embodiment will not be described here, as they are the same as those of the snapshot management program 1263 of the third embodiment.

In step S18030, of all recovery points within the Requested RTO Application Period 9007, it is determined, on the basis of the information obtained in step S13020, whether an RTO for the recovery point of a journal with the smallest sequence number (hereinafter called "the oldest journal") is larger than the Requested RTO 9006. In this step, when snapshots are sorted by sequence number, the first snapshot with a sequence number larger than that of the oldest journal is initially identified. When it is determined, in a similar manner, whether an RTO for the recovery point of a specific journal (regardless of whether it is the oldest journal) is larger than the Requested RTO 9006, a snapshot identified according to the procedure described above will be hereinafter called "one-generation newer snapshot". Then, a Before journal with a sequence number equal to or less than that of the one-generation newer snapshot and larger than or equal to that of the oldest journal is identified, and its application period is determined in a similar manner to that in step S13030 of the third embodiment. Then, it is determined whether the determined application period is longer than the Requested RTO 9006. If no one-generation newer snapshot exists, the application period is determined with respect to all journals with sequence numbers equal to or larger than the sequence number of the oldest journal.

If it is determined in step S18030 that an RTO for the recovery point of the oldest journal is equal to or less than the Requested RTO 9006, the process proceeds to step S18080.

If it is determined in step S18030 that an RTO for the recovery point of the oldest journal is larger than the Requested RTO 9006, it is determined whether a one-generation newer snapshot exists (step S18040). In this step, a one-generation newer snapshot is searched for by the same method as that used in step S18030.

If it is determined in step S18040 that a one-generation newer snapshot exists, step S18050 is skipped and the process proceeds to step S18060.

If it is determined in step S18040 that no one-generation newer snapshot exists, a new snapshot is taken (step S18050). In this step, an SSVOL group is created and associated with a journal group in a similar manner to that in step S13066. Then, the snapshot management program 1263 requests the storage microprogram 1028 to take a new snapshot. In response, the storage microprogram 1028 stores the snapshot of a data volume in the newly associated SSVOL group, and copies the value of the Sequence Counter 3003 to the Sequence Number 5003 of the newly associated SSVOL group. Moreover, the storage microprogram 1028 obtains the current time from the timer 1024 and sets the obtained current time as the Acquisition Time 5004 of the newly associated SSVOL group. The newly obtained snapshot is determined to be a one-generation newer snapshot.

Then, a Before journal is applied to update the one-generation newer snapshot (step S18060). In this step, first, the maximum amount of application data applicable within the time period indicated by the Requested RTO 9006 is determined from the Journal Application Speed 5005 for the one-generation newer snapshot. In the present embodiment, this can be determined by multiplying the Journal Application Speed 5005 by the Requested RTO 9006. Then, with respect to the group of journal headers of the Before journals identified in step S18030, the Data Length 2103 is added one by one in ascending order of the Sequence Number 2105. When the above-described maximum amount of application data has been exceeded, a journal header having the data length that was last added is identified. Then, the configuration program 1265 requests the storage microprogram 1028 to sequentially apply the Before journals to the one-generation newer snapshot in descending order of sequence numbers until the Sequence Number 2105 of the identified journal header is reached. After updating the one-generation newer snapshot, the storage microprogram 1028 copies the Creation Time 2104 of a Before journal with a sequence number smaller than that of the last-applied Before journal by one to the Acquisition Time 5004 of the latest snapshot, and copies the Sequence Number 2105 to the Sequence Number 5003.

Next, it is determined whether an RTO for a recovery point after the one-generation newer snapshot is larger than the requested RTO (step S18070). In this step, first, a journal with a sequence number larger than that of the one-generation newer snapshot by one is identified. Hereinafter, this journal will be referred to as "the immediate subsequent journal". Then, when snapshots are sorted by sequence number, the first snapshot with a sequence number larger than that of the immediate subsequent journal is identified. As described above, in the following steps, this identified snapshot is determined to be the one-generation newer snapshot. Then, a Before journal with a sequence number equal to or less than that of the one-generation newer snapshot and larger than or equal to that of the immediate subsequent journal is identified, and its application period is determined in a similar manner to that in step S13030 of the third embodiment. Then, it is determined whether the determined application period is longer than the Requested RTO 9006. If no one-generation newer snapshot exists, the application period is determined with respect to all journals with sequence numbers equal to or larger than the sequence number of the oldest journal.

If it is determined in step S18070 that an RTO for the recovery point of the immediate subsequent journal is larger than the Requested RTO 9006, the process returns to step S18040.

If it is determined in step S18070 that an RTO for the recovery point of the immediate subsequent journal is equal to or less than the Requested RTO 9006, it is determined whether a one-generation newer snapshot exists (step S18080). The processing in this step is performed in a similar manner to that in step S18040.

If it is determined in step S18080 that a one-generation newer snapshot exists, the process returns to step S18070. If it is determined in step S18080 that no one-generation newer snapshot exists, the RTO adjustment with respect to all recovery points within the requested RTO application period is completed, and the process returns to step S13010, where the snapshot management program 1263 waits for the next monitoring time.

As described above in the fourth embodiment, in the system that performs backup and recovery operations based on the journaling technique by a method different from those used in the first to third embodiments, data at any point in time can be recovered within an RTO requested by the administrator, since the time period required for journal application to a snapshot is consistently below a certain level.

As described above, in the computer system according to a first aspect of the present invention, the management computer instructs the storage system to determine whether the updating of the latest snapshot prevents data at a recovery point before the recovery point of the updated latest snapshot from being recovered within a recovery time requested by an administrator and to apply, if it has been determined that the data cannot be recovered within the recovery time requested by the administrator, a journal to a snapshot older than the latest snapshot to update the older snapshot to a new snapshot in such a manner that the data can be recovered within the recovery time requested by the administrator.

In the computer system according to a second aspect of the present invention, the management computer sequentially tracks snapshots older than the latest snapshot up to a predetermined number of generations ago.

In the computer system according to a third aspect of the present invention, the management computer has a plurality of recovery times, and an older generation recovery time is equal to or longer than a newer generation recovery time.

In the computer system according to a fourth aspect of the present invention, the management computer determines whether a snapshot to be updated is the oldest snapshot and saves, if it has been determined that the snapshot to be updated is the oldest snapshot, data to be overwritten at the time of journal application to the snapshot to be updated, thereby maintaining a recovery point that a journal dependent on the snapshot to be updated has.

In the computer system according to a fifth aspect of the present invention, the management computer determines whether a snapshot to be updated is the oldest snapshot and creates, if it has been determined that the snapshot to be updated is the oldest snapshot, a new snapshot storage area, and creates a copy of the snapshot to be updated.

In the computer system according to a sixth aspect of the present invention, the management computer obtains, from a controller of the storage system, journal storage information, snapshot storage information, and a journal application speed to determine whether data at a recovery point after a recovery point of the latest snapshot can be recovered within a specific period of time.

In the computer system according to a seventh aspect of the present invention, the management computer saves a series of data items to be overwritten by the host computer, assigns appropriate sequence numbers to the series of data items according to the order in which the series of data items were saved, stores the series of data items as a journal, and instructs the storage system to apply the saved and stored journal to the latest snapshot so as to update the latest snapshot to a new snapshot.

In an eighth aspect of the present invention, a management computer that manages a computer system including at least one host computer and a storage system for obtaining a snapshot, at a specific point in time, of a data volume to and from which data used by the host computer is written and read, storing data written to the data volume after the specific point in time as a journal, and applying the journal to the snapshot, for data recovery, on the basis of a snapshot obtained in close proximity to a recovery point, thereby recovering data includes a CPU, a memory, and an interface for connection. The management computer instructs the storage system to determine whether data at a recovery point after a recovery point of the latest snapshot can be recovered within a specific period of time and to apply, if it has been determined that the data cannot be recovered within the specific period of time, a journal to the latest snapshot to update the latest snapshot to a new snapshot in such a manner that the data can be recovered within the specific period of time.

In a ninth aspect of the present invention, the management computer instructs the storage system to determine whether the updating of the latest snapshot prevents data at a recovery point before the recovery point of the updated latest snapshot from being recovered within a recovery time requested by an administrator and to apply, if it has been determined that the data cannot be recovered within the recovery time requested by the administrator, a journal to a snapshot older than the latest snapshot to update the older snapshot to a new snapshot in such a manner that the data can be recovered within the recovery time requested by the administrator.

In a tenth aspect of the present invention, the management computer sequentially tracks snapshots older than the latest snapshot up to a predetermined number of generations ago.

In an eleventh aspect of the present invention, the management computer has a plurality of recovery times, and an older generation recovery time is equal to or longer than a newer generation recovery time.

In a twelfth aspect of the present invention, the management computer determines whether a snapshot to be updated is the oldest snapshot and saves, if it has been determined that the snapshot to be updated is the oldest snapshot, data to be overwritten at the time of journal application to the snapshot to be updated, thereby maintaining a recovery point that a journal dependent on the snapshot to be updated has.

In a thirteenth aspect of the present invention, the management computer determines whether a snapshot to be updated is the oldest snapshot and creates, if it has been determined that the snapshot to be updated is the oldest snapshot, a new snapshot storage area, and creates a copy of the snapshot to be updated.

In a fourteenth aspect of the present invention, the management computer obtains, from the storage system, journal storage information, snapshot storage information, and a journal application speed to determine whether data at a recovery point after a recovery point of the latest snapshot can be recovered within a specific period of time.

In a fifteenth aspect of the present invention, a storage system for obtaining a snapshot, at a specific point in time, of a data volume to and from which data used by at least one host computer connected to the storage system via a network is written and read, storing data written to the data volume after the specific point in time as a journal, and applying the journal to the snapshot, for data recovery, on the basis of a snapshot obtained in close proximity to a recovery point, thereby recovering data includes a disk unit, a CPU, a main memory, and an interface for connection. The storage system determines whether data at a recovery point after a recovery point of the latest snapshot can be recovered within a specific period of time and applies, if it has been determined that the data cannot be recovered within the specific period of time, a journal to the latest snapshot to update the latest snapshot to a new snapshot in such a manner that the data can be recovered within the specific period of time.

In a sixteenth aspect of the present invention, a backup management method used by a computer system including at least one host computer, a storage system with a controller for obtaining a snapshot, at a specific point in time, of a data volume to and from which data used by the host computer is written and read, storing data written to the data volume after the specific point in time as a journal, and applying the journal to the snapshot, for data recovery, on the basis of a snapshot obtained in close proximity to a recovery point, thereby recovering data, and a management computer connected to the storage system includes the steps of determining whether data at a recovery point after a recovery point of the latest snapshot can be recovered within a specific period of time, and instructing the storage system, if it has been determined that the data cannot be recovered within the specific period of time, to apply a journal to the latest snapshot to update the latest snapshot to a new snapshot in such a manner that the data can be recovered within the specific period of time.

In a seventeenth aspect of the present invention, the backup management method further includes the steps of determining whether the updating of the latest snapshot prevents data at a recovery point before the recovery point of the updated latest snapshot from being recovered within a recovery time requested by an administrator, and instructing the storage system, if it has been determined that the data cannot be recovered within the recovery time requested by the administrator, to apply an After journal to a snapshot older than the latest snapshot to update the older snapshot to a new snapshot in such a manner that the data can be recovered within the recovery time requested by the administrator.

In an eighteenth aspect of the present invention, the backup management method further includes the step of sequentially tracking snapshots older than the latest snapshot up to a predetermined number of generations ago.

In a nineteenth aspect of the present invention, the backup management method further includes the steps of determining whether a snapshot to be updated is the oldest snapshot, and saving, if it has been determined that the snapshot to be updated is the oldest snapshot, data to be overwritten at the time of journal application to the snapshot to be updated, thereby maintaining a recovery point that a journal dependent on the snapshot to be updated has.

What is claimed is:

1. A computer system comprising:
   at least one host computer;
   a storage system for obtaining a snapshot, at a specific point in time, of a data volume to and from which data used by the host computer is written and read, storing data written to the data volume after the specific point in time as a journal, and applying the journal to the snapshot, for data recovery, on the basis of a snapshot obtained in close proximity to a recovery point, thereby recovering data; and
   a management computer;
   wherein the host computer, the storage system, and the management computer are connected to each other via a network; and the management computer instructs the storage system to determine whether data at a recovery point after a recovery point of the latest snapshot can be recovered within a specific period of time and to apply, if it has been determined that the data cannot be recovered within the specific period of time, a journal to the latest snapshot to update the latest snapshot to a new snapshot in such a manner that the data can be recovered within the specific period of time.

2. The computer system according to claim 1, wherein the management computer instructs the storage system to determine whether the updating of the latest snapshot prevents data at a recovery point before the recovery point of the updated latest snapshot from being recovered within a recovery time requested by an administrator and to apply, if it has been determined that the data cannot be recovered within the recovery time requested by the administrator, a journal to a snapshot older than the latest snapshot to update the older snapshot to a new snapshot in such a manner that the data can be recovered within the recovery time requested by the administrator.

3. The computer system according to claim 2, wherein the management computer sequentially tracks snapshots older than the latest snapshot up to a predetermined number of generations ago.

4. The computer system according to claim 2, wherein the management computer has a plurality of recovery times, and an older generation recovery time is equal to or longer than a newer generation recovery time.

5. The computer system according to claim 2, wherein the management computer determines whether a snapshot to be updated is the oldest snapshot and saves, if it has been determined that the snapshot to be updated is the oldest snapshot, data to be overwritten at the time of journal application to the snapshot to be updated, thereby maintaining a recovery point that a journal dependent on the snapshot to be updated has.

6. The computer system according to claim 2, wherein the management computer determines whether a snapshot to be updated is the oldest snapshot and creates, if it has been determined that the snapshot to be updated is the oldest snapshot, a new snapshot storage area, and creates a copy of the snapshot to be updated.

7. The computer system according to claim 1, wherein the management computer obtains, from the storage system, journal storage information, snapshot storage information, and a journal application speed to determine whether data at a recovery point after a recovery point of the latest snapshot can be recovered within a specific period of time.

8. The computer system according to claim 1, wherein the management computer saves a series of data items to be overwritten by the host computer, assigns appropriate sequence numbers to the series of data items according to the order in which the series of data items were saved, stores the series of data items as a journal, and instructs the storage system to apply the saved and stored journal to the latest snapshot so as to update the latest snapshot to a new snapshot.

9. A management computer for managing a computer system including at least one host computer and a storage system for obtaining a snapshot, at a specific point in time, of a data volume to and from which data used by the host computer is written and read, storing data written to the data volume after the specific point in time as a journal, and applying the journal to the snapshot, for data recovery, on the basis of a snapshot obtained in close proximity to a recovery point, thereby recovering data, the management computer comprising:
 a central processing unit;
 a memory; and
 an interface for connection,
 wherein the management computer instructs the storage system to determine whether data at a recovery point after a recovery point of the latest snapshot can be recovered within a specific period of time and to apply, if it has been determined that the data cannot be recovered within the specific period of time, a journal to the latest snapshot to update the latest snapshot to a new snapshot in such a manner that the data can be recovered within the specific period of time.

10. The management computer according to claim 9, wherein the management computer instructs the storage system to determine whether the updating of the latest snapshot prevents data at a recovery point before the recovery point of the updated latest snapshot from being recovered within a recovery time requested by an administrator and to apply, if it has been determined that the data cannot be recovered within the recovery time requested by the administrator, a journal to a snapshot older than the latest snapshot to update the older snapshot to a new snapshot in such a manner that the data can be recovered within the recovery time requested by the administrator.

11. The management computer according to claim 10, wherein the management computer sequentially tracks snapshots older than the latest snapshot up to a predetermined number of generations ago.

12. The management computer according to claim 10, wherein the management computer has a plurality of recovery times, and an older generation recovery time is equal to or longer than a newer generation recovery time.

13. The management computer according to claim 10, wherein the management computer determines whether a snapshot to be updated is the oldest snapshot and saves, if it has been determined that the snapshot to be updated is the oldest snapshot, data to be overwritten at the time of journal application to the snapshot to be updated, thereby maintaining a recovery point that a journal dependent on the snapshot to be updated has.

14. The management computer according to claim 10, wherein the management computer determines whether a snapshot to be updated is the oldest snapshot and creates, if it has been determined that the snapshot to be updated is the oldest snapshot, a new snapshot storage area, and creates a copy of the snapshot to be updated.

15. The management computer according to claim 9, wherein the management computer obtains, from the storage system, journal storage information, snapshot storage information, and a journal application speed to determine whether data at a recovery point after a recovery point of the latest snapshot can be recovered within a specific period of time.

16. A storage system for obtaining a snapshot, at a specific point in time, of a data volume to and from which data used by at least one host computer connected to the storage system via a network is written and read, storing data written to the data volume after the specific point in time as a journal, and applying the journal to the snapshot, for data recovery, on the basis of a snapshot obtained in close proximity to a recovery point, thereby recovering data, the storage system comprising:
 a disk unit;
 a central processing unit;
 a main memory; and
 an interface for connection;
 wherein the storage system determines whether data at a recovery point after a recovery point of the latest snapshot can be recovered within a specific period of time and applies, if it has been determined that the data cannot be recovered within the specific period of time, a journal to the latest snapshot to update the latest snapshot to a new snapshot in such a manner that the data can be recovered within the specific period of time.

17. A backup management method used by a computer system including at least one host computer, a storage system with a controller for obtaining a snapshot, at a specific point in time, of a data volume to and from which data used by the host computer is written and read, storing data written to the data volume after the specific point in time as a journal, and applying the journal to the snapshot, for data recovery, on the basis of a snapshot obtained in close proximity to a recovery point, thereby recovering data, and a management computer connected to the storage system, the backup management method comprising the steps of:

determining whether data at a recovery point after a recovery point of the latest snapshot can be recovered within a specific period of time; and instructing the storage system, if it has been determined that the data cannot be recovered within the specific period of time, to apply a journal to the latest snapshot to update the latest snapshot to a new snapshot in such a manner that the data can be recovered within the specific period of time.

18. The backup management method according to claim 17, further comprising the steps of determining whether the updating of the latest snapshot prevents data at a recovery point before the recovery point of the updated latest snapshot from being recovered within a recovery time requested by an administrator; and instructing the storage system, if it has been determined that the data cannot be recovered within the recovery time requested by the administrator, to apply an After journal to a snapshot older than the latest snapshot to update the older snapshot to a new snapshot in such a manner that the data can be recovered within the recovery time requested by the administrator.

19. The backup management method according to claim 18, further comprising the step of sequentially tracking snapshots older than the latest snapshot up to a predetermined number of generations ago.

20. The backup management method according to claim 18, further comprising the steps of determining whether a snapshot to be updated is the oldest snapshot; and saving, if it has been determined that the snapshot to be updated is the oldest snapshot, data to be overwritten at the time of journal application to the snapshot to be updated, thereby maintaining a recovery point that a journal dependent on the snapshot to be updated has.

* * * * *